(12) United States Patent
Brown

(10) Patent No.: US 8,267,830 B2
(45) Date of Patent: Sep. 18, 2012

(54) COMBINATION CONTINUOUSLY VARIABLE TRANSMISSION AND PLANETARY TRANSMISSION

(76) Inventor: Albert W. Brown, Newport Beach, CA (US)

( * ) Notice: Subject to any disclaimer, the term of this patent is extended or adjusted under 35 U.S.C. 154(b) by 642 days.

(21) Appl. No.: 12/535,527

(22) Filed: Aug. 4, 2009

(65) Prior Publication Data

US 2009/0286643 A1 Nov. 19, 2009

Related U.S. Application Data

(63) Continuation-in-part of application No. 11/265,378, filed on Nov. 2, 2005, now abandoned, which is a continuation-in-part of application No. 11/033,206, filed on Jan. 11, 2005, now abandoned, application No. 12/535,527, filed on Aug. 4, 2009, which is a continuation-in-part of application No. 11/460,589, filed on Jul. 27, 2006, now abandoned, and a continuation-in-part of application No. 12/126,586, filed on May 23, 2008, now Pat. No. 7,811,188.

(60) Provisional application No. 60/704,472, filed on Aug. 1, 2005, provisional application No. 60/939,808, filed on May 23, 2007.

(51) Int. Cl.
*F16H 37/02* (2006.01)
(52) U.S. Cl. ...................................... 475/210
(58) Field of Classification Search .................. 475/210, 475/213
See application file for complete search history.

(56) References Cited

U.S. PATENT DOCUMENTS

| 4,682,518 A * | 7/1987 | Takada et al. .................. 477/41 |
| 2005/0107205 A1 * | 5/2005 | Veil et al. ..................... 475/210 |
| 2006/0030447 A1 * | 2/2006 | Kita ............................. 475/210 |

* cited by examiner

*Primary Examiner* — Edwin A Young
(74) *Attorney, Agent, or Firm* — Knobbe, Martens, Olson & Bear, LLP

(57) ABSTRACT

A modular assembly of a transmission is provided in which a continuously variable transmission module is separable from a planetary transmission module. When connected, the two modules function as a single transmission. The two modules are connectable in multiple orientations relative to each other. A single fluid source can be provided for operation of the two modules.

19 Claims, 22 Drawing Sheets

FIG. 23

COMBINATION CONTINUOUSLY VARIABLE TRANSMISSION AND PLANETARY TRANSMISSION

CROSS-REFERENCE TO RELATED APPLICATIONS

This application is a continuation-in-part of U.S. patent application Ser. No. 11/265,378, filed on Nov. 2, 2005, which is a continuation-in-part of U.S. patent application Ser. No. 11/033,206, filed on Jan. 11, 2005. This application also is a continuation-in-part of U.S. patent application Ser. No. 11/460,589, which was filed on Jul. 27, 2006, which claimed priority under 35 U.S.C. §119(e) to U.S. Provisional Patent Application No. 60/704,472, filed on Aug. 1, 2005. This application also is a continuation-in-part of U.S. patent application Ser. No. 12/126,586, filed on May 23, 2008, which claimed priority under 35 U.S.C. §119(e) to U.S. Provisional Patent Application No. 60/939,808, filed on May 23, 2007. Each of these applications is hereby expressly incorporated by reference in its entirety.

BACKGROUND OF THE INVENTION

1. Field of the Invention

The present invention generally relates to transmission units having a continuously variable transmission module and a planetary transmission module. More particularly, the present invention relates to such transmission units in which the fluid flow is integrated, the modules are separable and the control of the continuously variable transmission module can be performed without electronics.

2. Description of the Related Art

Transmissions are known that combine continuously variable transmission components with planetary components. Most of these transmissions require separate assemblies that are not useful with other types of non-integrated transmissions. Furthermore, such constructions are limited in the ability to adjust the structures to accommodate differing needs between differing vehicles.

Moreover, most of the continuously variable transmissions in use require complicated electronic control strategies. Such strategies gather information from engine and driveline sensors, including the driver actuated throttle position. The gathered information is used to control the ratio changing and chain clamping forces by selective manipulation of the hydraulic system pressures. These systems are complex and feature many components that increase the cost of manufacture.

SUMMARY OF THE INVENTION

A simplified transmission is desired. The transmission preferably features a continuously variable transmission module that is separable from a planetary transmission module. Together, the two modules define a full function transmission with ratio changing, at least two forward drive gears ratios, reverse drive, neutral and park. The two modules can be operated through a single fluid source and operation of the continuously variable transmission can be conducted without complex electronics.

Accordingly, one aspect of an embodiment of the present invention can provide a modular transmission assembly comprising a continuously variable transmission module and a hydraulically-actuated planetary transmission module. The continuously variable transmission module preferably comprises a CVT input shaft. The CVT input shaft is coupled to a clutch assembly. The CVT input shaft is coupled to an input pulley assembly. The input pulley assembly is connected to an output pulley assembly by a flexible transmitter. The input pulley assembly and CVT output pulley assembly are substantially identical in construction. The CVT output pulley assembly is coupled to a CVT output shaft. The CVT input shaft comprises a first end and a second end. The first end comprises a first bore that extends along a rotational axis of the CVT input shaft. The first bore comprises a splined inner surface. The second end of the CVT input shaft comprises a second bore and a journal portion. The second bore extends along the rotational axis of the CVT input shaft. The second bore also extends inward along the rotational axis to a location beyond the journal portion. The second end of the CVT input shaft further comprises an externally threaded region that is generally adjacent to the journal portion. A lock nut is threaded onto the externally threaded region. A bearing is positioned along the journal portion. The bearing comprises an inner race that is secured in position by the lock nut. The bearing comprises an outer race that is secured in position by a retaining ring. The input pulley assembly comprises a bulkhead mounted to the CVT input shaft. The CVT input shaft comprises a locating step and the bulkhead generally abuts the locating step. The bulkhead and the CVT input shaft are joined for rotation. The bulkhead comprises an outer skirt. The outer skirt comprises an outer skirt spline region and a bearing region. A small gap is provided between the outer skirt spline region and the bearing region. A ring groove is disposed within the small gap. The ring groove receives a sealing component. The first end of the input shaft comprises a disk portion and a journal portion. The journal portion overlaps at least a portion of the first bore. A movable disk has a portion positioned between the disk portion of the first end of the CVT input shaft and the bulkhead. The movable disk comprises an inner bore. The CVT input shaft extends through the inner bore of the movable disk. The movable disk also comprises a cylinder wall. The cylinder wall extends over an outer surface of the bulkhead. The sealing component of the bulkhead is positioned between an inner surface of the cylinder wall and the ring groove of the bulkhead. The inner surface of the cylinder wall comprises a cylinder wall spline region. The cylinder wall spline region engages the outer skirt spline region. An input pulley cylinder chamber is defined by the cylinder wall, the bulkhead and the movable disk. A radial passage extends from the second bore of the CVT input shaft and opens into the input pulley cylinder chamber. The continuously variable transmission module further comprises an outer housing. The outer housing completely encloses substantially all moving components of the continuously variable transmission module. The outer housing comprises two separable substantially identical housing portions. The two separable substantially identical housing portions define, when combined, a belt chamber that encloses the input pulley assembly, the output pulley assembly and the flexible transmitter. The separable substantially identical housing portions each comprises a flange along which the two separable substantially identical housing portions are joined. The two separable substantially identical housing portions support the input pulley assembly and the output pulley assembly. A lower portion of the housing defines a sump. A tube extends into the second bore of the CVT input shaft from the second end of the CVT input shaft. A first end of the tube is secured against rotation such that rotation of the CVT input shaft does not result in substantial rotation of the tube. A second end of the tube carries a plug. The plug generally closes the second end of the tube. The plug comprises a through bore. The hydraulically-actuated planetary transmission module comprises a planetary input shaft. The planetary input shaft is coupled to the CVT output shaft. The planetary input shaft also is connected to a forward drive gear and a reverse drive gear. The forward drive gear and the reverse drive gear are connected to a planetary output shaft. The planetary transmission module further comprises a park position and a neutral position. The hydraulically-actuated planetary transmission module comprises a planetary outer housing. The planetary outer housing encloses substantially all of the moving components of the hydraulically-actuated planetary transmission. The planetary outer housing comprises a speedometer pickup mounting location and an odometer pickup mounting location. A fluid reservoir communicates with the hydraulically-actuated planetary transmission module. A selector valve is connected to a shift actuator. The selector valve is selectively fluidly connected to a high clutch pack, a reverse clutch pack and a low brake band. The selector valve also is fluidly connected to the fluid reservoir through a first hydraulic pump. A pressure regulator controls a pressure of the connection between the selector valve and the first hydraulic pump. The input pulley cylinder chamber also is fluidly connected to the fluid reservoir through the first hydraulic pump. The pressure regulator also controls the pressure of the connection between the input pulley cylinder chamber and the first hydraulic pump. An adapter plate couples the continuously variable transmission module to the hydraulically-actuated planetary transmission module. The adapter plate is formed to allow the continuously variable transmission module to be coupled at more than one orientation relative to the hydraulically-actuated planetary transmission module. The adapter plate comprises a first set of holes that align with mounting features on the continuously variable transmission module and a second set of holes that align with mounting features on the hydraulically-actuated planetary transmission module. The adapter plate does not form a portion of the outer housing of the continuously variable transmission module or an outer housing of the hydraulically-actuated planetary transmission module.

BRIEF DESCRIPTION OF THE DRAWINGS

These and other features, aspects and advantages of embodiments of the transmission will now be described with reference to certain drawings. The illustrated embodiments are intended to illustrate and not to limit the invention.

FIGS. 20-23 are schematic representations of various transmission control configurations that can be implemented in the transmission of FIG. 1.

DETAILED DESCRIPTION OF THE PREFERRED EMBODIMENT

Figure 1:
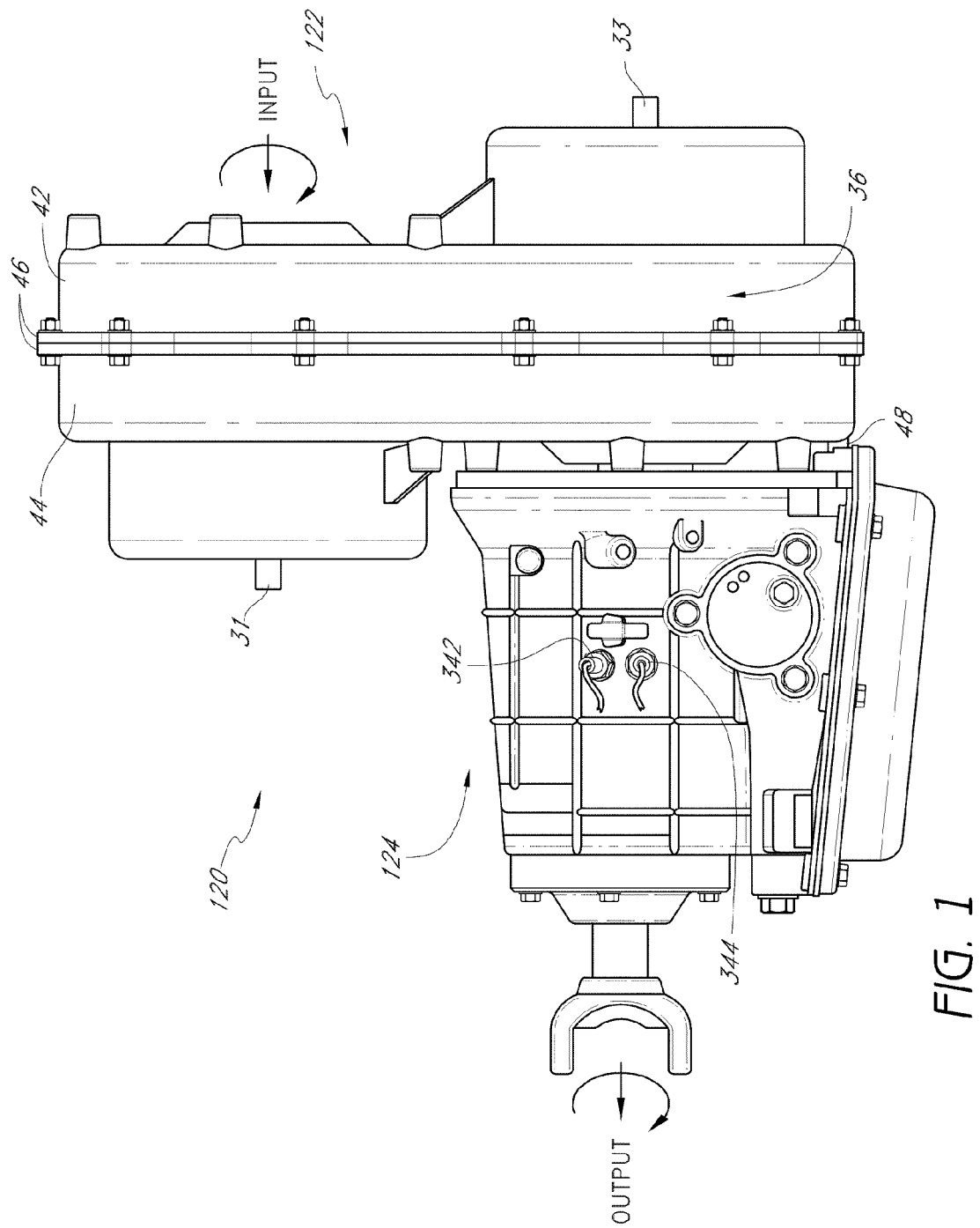
FIG. 1 shows a transmission having a continuously variable transmission (CVT) module and a planetary module that are connected together.

With reference initially to FIG. 1, a complete multifunction transmission 120 is illustrated therein. As used herein, "multifunction" is intended to have its ordinary meaning and to mean that the transmission facilitates forward and reverse operation and, in some instances, provides a neutral position and a park position as well as, in some further instances, a speedometer pickup mounting location and an odometer pickup mounting location. While the preferred embodiment is designed for vehicular applications, certain features, aspects and advantages of the present invention may have utility in other applications.

The transmission 120 that is illustrated in FIG. 1 comprises a CVT module 122 and a planetary module 124. The illustrated planetary module 124 is a two-speed planetary module and the illustrated CVT module 122 is a single belt CVT module. Other types of planetary and CVT modules can be used; however, the illustrated combination has been determined to be advantageous in its simplicity. In one embodiment, a 2 to 1 planetary module 124 (i.e., reduction gear) can be coupled to the CVT module 122, which results in a low range of about 5 to 1 (a transmission input shaft rotates 5 times for each rotation of a transmission output shaft) for the complete transmission. The low range of about 5 to 1 can be acceptable with choices of various rear axle ratios while the planetary module ratio is about 2 to 1; however, keeping a reduction of 2 to 1 at the planetary module, in some installations, does not provide an adequate overdrive ratio. Making the 2 to 1 reduction of the planetary module 124 (a low planetary gear position) shiftable back to a 1 to 1 ratio (a high planetary gear position), however, restores to 0.4 to 1 the overdrive ratio (i.e., high range) of the complete transmission, which results in an overall ratio (low to high) of the complete transmission on the order of about 7.5 to 1, which should be a more than adequate ratio spread for nearly all contemplated installations.

Installing a shiftable arrangement (such as provided with the planetary module 124) at an input shaft of the CVT module 122 would, at 2 to 1, reduce the level of engine torque input that could be handled by the CVT module 122. In other words, the CVT module 122 would need to be engineered to tolerate loads up to twice the size that the associated engine is capable of generating. Thus, in the illustrated configuration, the planetary module 124 preferably is positioned at an output shaft of the CVT module 122 to accept a maximum allowable 800 N.m. input torque, in some configurations, and to multiply the drive shaft torque by a factor of 5, for example.

While not shown, a clutching configuration can be provided between the engine and the input shaft of the transmission 120 (i.e., an input shaft of the CVT module 122). Suitable clutching configurations can be manual foot operated clutches, torque converters and the like.

In addition, from a commercially practical standpoint, the transmission 120 preferably is capable of shifting between ratios while the associated vehicle is in motion and under power. Accordingly, in the preferred configuration, the CVT module 122 advantageously is coupled to the hydraulically actuated planetary module 124, together with suitable controls. As stated above, the planetary module 124 preferably comprises at least two gearing combinations (e.g., high and low) and more preferably also includes a planetary reverse position and a neutral position. In one configuration, a parking position also is included.

The CVT module 122 can have any suitable configuration, including that shown and described in U.S. patent application Ser. No. 11/033,206, filed on Jan. 11, 2005, which is hereby incorporated by reference in its entirety. The planetary module 124 can be a modified component based upon a two-speed automatic transmission, such as a modified Powerglide transmission, which was sold by General Motors. For example, the structure of a planetary geared portion of a suitable two-speed transmission is described and shown in detail in U.S. Pat. No. 2,865,227, issued Dec. 23, 1958, and in Munroe, Carl H., Powerglide Transmission Handbook, How to Rebuild or Modify Chevrolet's Powerglide for All Applications, by Carl H. Monroe, HPBooks 2001, published by The Berkley Publishing Group, A division of Penguin Putnam Inc., 375 Hudson Street, New York, N.Y. 10014, each of which is hereby incorporated by reference in its entirety.

Preferably, the planetary module 124 features strengthened components to tolerate the loads resulting from receiving torque from the CVT module 122 and the planetary module 124, in the illustrated configuration, preferably has the standard torque converter removed. Depending upon the application, other modifications also can be made and further modifications will be discussed below.

Figure 3:
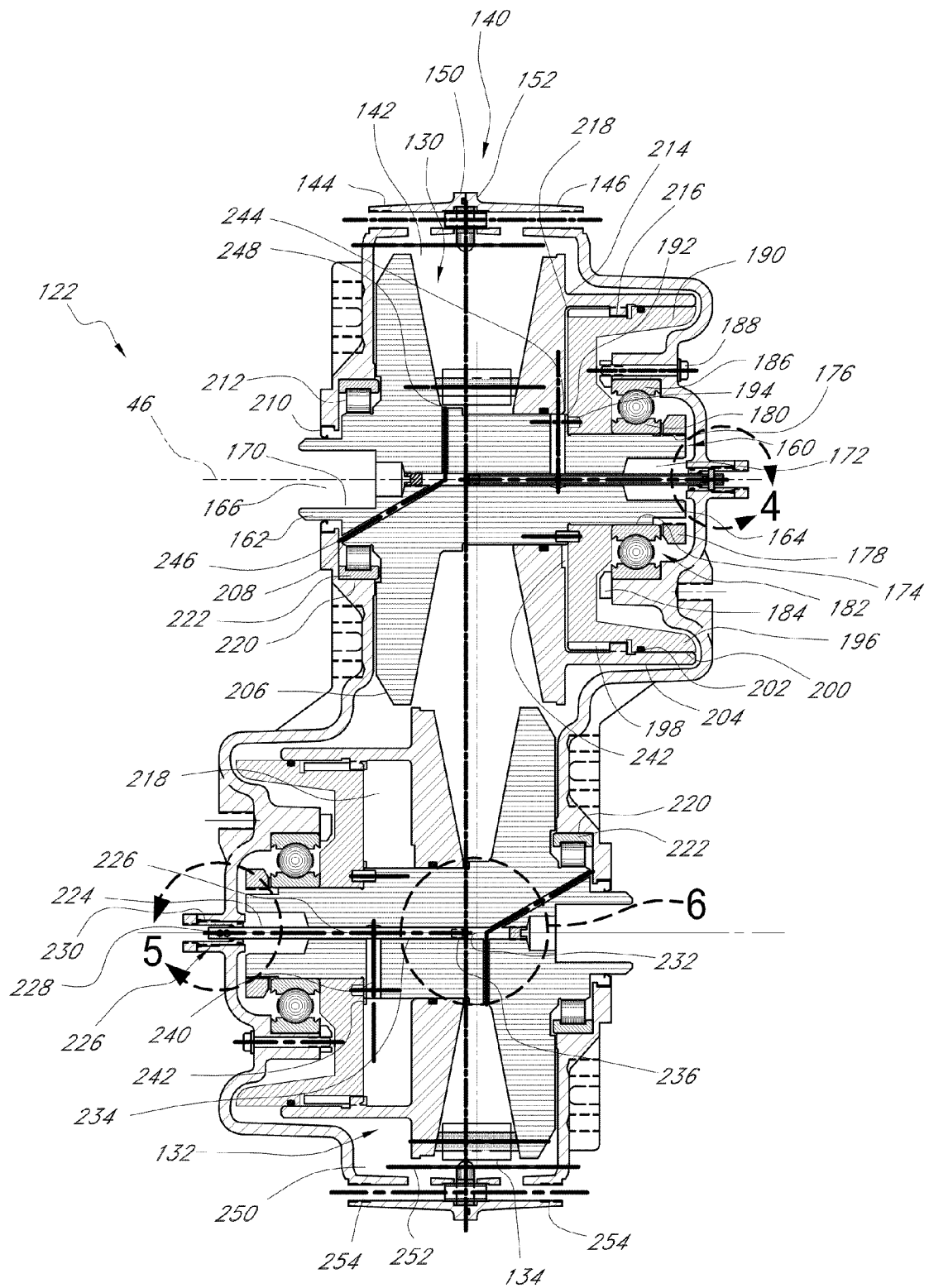
FIG. 3 is a sectioned view of a CVT module that can be the CVT module of FIG. 1.

With reference now to FIG. 3, the CVT module 122 generally comprises an input pulley assembly 130 and an output pulley assembly 132. A chain 134 connects the input pulley assembly 130 to the output pulley assembly 132. As used herein, the term "chain" means belt, chain or other suitable forms of endless loops that can be used to transfer power from one pulley to another pulley. "Chain" also means a series of usually metal links or rings connected to or fitted into one another and used for transmission of mechanical power.

In the illustrated arrangement, the two pulley assemblies 130, 132 are substantially, if not completely, identical in construction. While the CVT module 122 can comprise pulley assemblies that are not identical, the illustrated embodiment advantageously features nearly identical pulley assemblies 130, 132 such that the number of separate components needed to assemble the CVT module 122 can be reduced, which reduces overhead and operating costs of any facility assembling and/or selling the CVT module 122.

Almost all of the moving components of the illustrated CVT module 122 are completely housed within an outer housing 140. In the illustrated arrangement, the outer housing 140 comprises two pieces, which are substantially identical to each other. While such an arrangement advantageously reduces manufacturing costs, other suitable configurations also can be used. The outer housing 140 defines a belt chamber 142 that contains the pulley assemblies 130, 132 and the chain 134. In the illustrated arrangement, the housing 140 comprises a first portion 144 and a second portion 146 that are joined together along a flange 150. Preferably, the flange 150 has a portion defined by the first portion 144 of the housing 140 and another portion defined by the second portion 146 of the housing 140. Such a configuration is consistent with the desire for having nearly identical first and second portions 144, 146 of the housing 140.

The housing portions 144, 146 have been designed for manufacture with an aluminum permanent mold but other manufacturing techniques, and corresponding design changes, can be used. For instance, given high enough production quantities, an aluminum die casting can be used and the design can incorporate differing wall thicknesses and support ribs.

Figure 2:
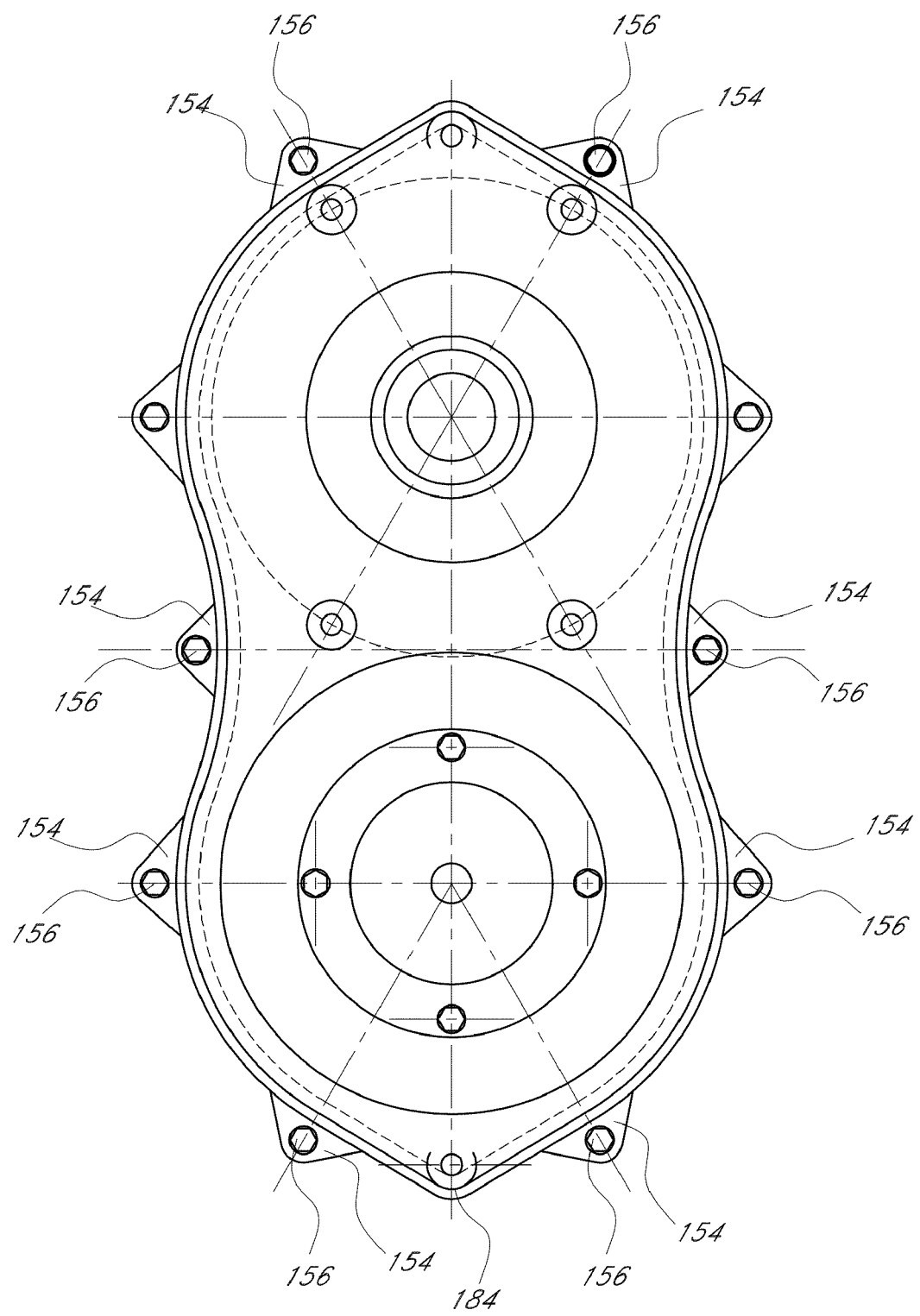
FIG. 2 is an external end view of a housing of the CVT module of FIG. 1.

In the illustrated arrangement, the flange 150 of one of the housing halves can be provided with a groove that accommodates a seal 152. In some arrangements, a gasket or other sealing structure can be positioned within the flange and can be used to create a substantially fluid-tight belt chamber 142. The portions 144, 146 of the housing 140 can comprise bosses 154, shown in FIG. 2, that are used to secure the portions 144, 146 together. In the illustrated arrangement, the bosses can be secured together with threaded fasteners 156, shown in FIG. 2, such as bolts and nuts, but other manners of securing the portions 144, 146 together can be used.

The two portions 144, 146 of the outer housing 140 support the input pulley assembly 130 and the output pulley assembly 132. As mentioned above, the input pulley assembly 130 and the output pulley assembly 132 in the illustrated embodiment generally have substantially identical structures. Therefore, the illustrated pulley assemblies 130, 132 will be described without reference to which pulley assembly is being described and the reference numerals may be applied to either of the pulley assemblies 130, 132 to reduce the number of reference numerals indicating elements on any single pulley assembly.

The input pulley assembly 130 is mounted on an input shaft 160. The input shaft 160 comprises a first end 162 and a second end 164. The first end 162 comprises a bore 166 that extends inward along a rotational axis 168 of the input shaft 160. The bore 166 can have any suitable configuration. In the illustrated arrangement, the bore 166 comprises splines 170 that can be used to couple the transmission to any suitable input system. For example, an output shaft from the engine can be coupled to the transmission by the splines 170. At its extreme second end, the illustrated input shaft 160 also comprises a bore 172. The bore 172 preferably extends inward through a journal portion 174 of the illustrated shaft 160.

Externally, the second end 164 of the input shaft 160 comprises a threaded region 176 and the journal region 174. A lock nut 178 engages the threaded region 176. The illustrated lock nut 178 secures an inner race 180 of a bearing 182 while a retaining ring 184 secures an outer race 186 of the bearing 182 in position. Any suitable arrangement can be used to secure the retaining ring 184 in position. In the illustrated arrangement, bolts or any suitable threaded fastener 188 secure the ring 184 in position. Thus, in the illustrated arrangement, the retaining ring 184 and the nut 178 capture the bearing 182 in position along the journal region 174 of the input shaft 160 such that the bearing 182 can generally resist axial thrust loads in both directions.

A bulkhead 190 is mounted to the shaft 160 and can be formed by casting, forging or any other suitable technique. In some arrangements, such as the illustrated arrangement, the input shaft 160 can comprise a locating step 192, which acts to properly position the bulkhead 190 relative to the input shaft 160 during assembly. Moreover, a plurality of pins 194, such as spring pins, for instance, can be used to secure the bulkhead 190 to the step 192 such that the bulkhead 190 and the input shaft 160 are secured together for rotation with substantially to absolutely zero backlash. In some arrangements, a spline coupling of the bulkhead 190 to the input shaft 160 can be used to rotationally secure the bulkhead 190 and the input shaft 160 with minimal backlash. In any event, the input shaft 160 preferably transfers input torque to the bulkhead 190 through the connection.

The bulkhead 190 comprises an outer skirt 196. An outer surface of the illustrated skirt 196 comprises an elongated spline region 198 and a bearing region 200. In the illustrated arrangement, a small gap is provided between the spline region 198 and the bearing region 200. Moreover, the outer surface of the skirt 196 also comprises a ring groove 202. The ring groove 202 accommodates an o-ring that is positioned to seal or substantially seal a sliding connection between the skirt 196 and a cylinder wall 204. Preferably, the ring groove 202 is positioned between the spline region 198 and the bearing region 200. More preferably, there is no or substantially no fluid loss due to leakage from the cylinders in the illustrated construction. The inside of the cylinder wall 204 slides along the skirt 196 during operation of the pulley assembly 130, as will be described in greater detail below.

With continued reference to FIG. 1, the first end 162 of the input shaft 160 comprises a disk portion 206 and a journal portion 208. Adjacent to the extreme first end, a seal 210 closes the opening between the housing 140 and the shaft 160. The journal portion 208 of the shaft 160 defines an inner race of a bearing 212. As such, the journal portion 208 preferably replaces an inner race of the bearing 212 and reduces the number of components that must be assembled when building the transmission 120. In some embodiments, however, the bearing 212 can include an inner race that is secured to or positioned on the shaft 160 in any suitable manner.

Adjacent to the journal portion 208 of the illustrated shaft 160, the disk portion 206 extends radially outward from the main body of the shaft 160. The illustrated disk portion 206 is integrally formed with the shaft 160 in the illustrated arrangement. In the illustrated arrangement, the shaft 160, which includes the illustrated disk portion 206, can be made from a simple forging. In other configurations, the disk portion 206 can be separately formed and secured to the shaft 160 in any suitable manner. The disk portion 206 forms one side of the cone shaped valley of the pulley assembly 130 in which the chain 134 is positioned.

The cylinder wall 204 described above forms a portion of a moveable disk 214 that translates along a portion of the input shaft 160. In the illustrated embodiment, the main portion of the moveable disk 214 is interposed between the disk portion 206 of the input shaft 160 and the bulkhead 190. The cylinder wall 204 preferably is integrally formed with the main portion of the moveable disk 214. As such, the moveable disk 214 preferably is formed as a near net size forging. In other arrangements, the cylinder wall 204 can be formed separately and secured to the moveable disk 214 in any suitable manner. The illustrated arrangement, however, advantageously reduces manufacturing and assembly costs.

The cylinder wall 204 also comprises a spline region 216. The spline region 216 engages the spline region 198 formed on the skirt 196 of the bulkhead 190. Because the cylinder wall 204 moves axially relative to the bulkhead 190, the spline region 216 of the cylinder wall 204 can be substantially shorter in length than the spline region 198 of the skirt 196 of the bulkhead 190. In some arrangements, the spline region 198 of the skirt 196 can be shorter in length than the spline region 216 of the cylinder wall 204.

A cylinder chamber 218 (for a better view, see the output pulley assembly 132) is defined within a region generally bounded by the bulkhead 190, the cylinder wall 204 and the moveable disk 214. This cylinder chamber 218 comprises a pressure chamber into which fluid can be introduced and from which fluid can be evacuated to cause movement of the moveable disk 214 relative to the bulkhead 190. As discussed above, the sliding connection between the skirt 196 and the cylinder wall 204 preferably is sealed by an o-ring or any other suitable sealing component.

The inside diameter of the cylinder wall 204 forms a close tolerance large bearing surface with the bearing region 90 of the skirt 196. In addition, a bore defined through an axial center of the moveable disk 214 is sized to form another close tolerance bearing surface relative to the input shaft 160. The interface between the input shaft 160 and the bore through the moveable disk 214 can form a first bearing while the interface between the inner surface of the cylinder wall and the outer surface of the skirt 196 of the bulkhead 190 forms a second bearing.

The two bearings are spaced with the larger diameter portion being positioned away from the chain 134. Together, the two bearings define an ample length to diameter ratio such that the face of the moveable disk 214 that bears against the chain 134 can remain substantially square and concentric without substantial binding or overloading during movement. In most embodiments, this arrangement facilitates movement of the moveable disk 214 even though the disk 214 is subjected to large asymmetric loads by the interface with the chain 134. Pressure changes within the chamber 218 during ratio changes cause the disk 214 to move relative to the bulkhead 190. The movement causes relative movement at the spline regions 198, 216. Because the large diameter bearing is positioned generally adjacent the spline regions 198, 216 in the illustrated arrangement, a tendency for the moveable disk 214 to wobble relative to the axis 168 during combined axial movement and rotational movement is greatly reduced or eliminated. Thus, the large diameter bearing surface forms a dominant alignment feature in the illustrated arrangement. Preferably, the bearing surfaces straddle the spline surface to help maintain a rigid and square configuration.

With reference to FIG. 3, the portions of the housing 140 each comprise a generally annular groove 220. The groove 220 preferably defines a bearing mounting location. In the illustrated arrangement, an outer race 222 of each bearing 212 can be pressed into place within the respective groove 220. As will be discussed below, the illustrated embodiment provides a construction that eliminates most of the significant sources of shaft thrust loading (with the exception of the loads generated by the interaction with the chains) and, therefore, the bearings 212 advantageously can contain what can be termed a full complement of rollers for maximum radial load carrying capability. The bearings 212 preferably require no cage. Instead, the rollers of each bearing 212 can be held in place during assembly with high-viscosity grease. Moreover, as discussed above, the shafts 160 define the inner race for the bearings 212 and no separate inner race is required. In some embodiments, other types and constructions of bearings, with or without inner races, can be used.

With reference still to FIG. 3, a tube 224 can be secured to the portion of the housing 140 that contains the retaining ring 184. With reference to U.S. application Ser. No. 11/032,924, filed on Jan. 11, 2005, entitled IN-SERIES TWO CHAIN CONTINUOUSLY VARIABLE TRANSMISSION, and having attorney docket number BROWA.037A, an arrangement is shown and described therein in which the tube 224 is secured in an inlet port by a compression fitting. This application is hereby incorporated by reference in its entirety.

Figure 4:
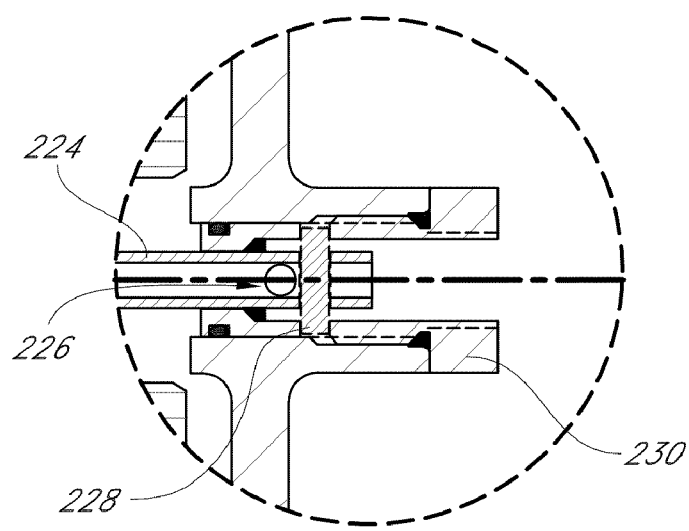
FIG. 4 is an enlarged portion of FIG. 3.
Figure 5:
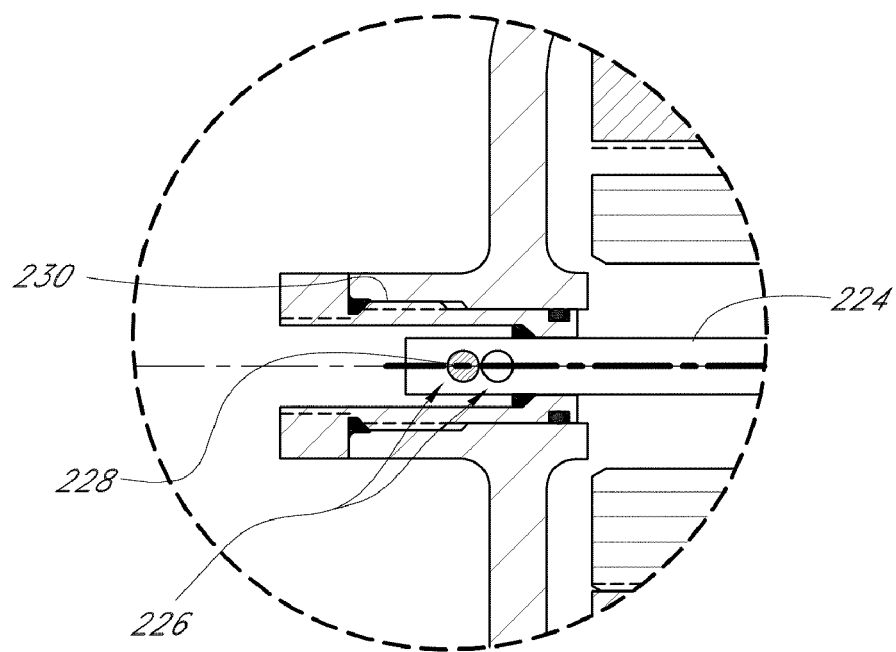
FIG. 5 is an enlarged portion of FIG. 3.

With reference to FIGS. 4 and 5, the end of the tube 224 can comprise a pair of holes 226 with one of the pair of holes accepting a pin 228 that secures the tube 224 into a fitting and the other of the pair of holes providing a fluid connection between the inside of the tube and the supply of lubricant, hydraulic oil or other suitable fluids. The pin 228 is shown in a generally vertical orientation on the input shaft 160 and in a generally horizontal (e.g., in and out of the paper) orientation on the shaft of the output shaft assembly 132.

A port fitting 230 to which the tube 224 is secured can extend from a periphery of the housing 140 and can be centrally positioned in the housing 140 along the axis of the shaft 160. The tube 224 advantageously defines a backbone of a supply gallery 232. The tube 224 preferably is axially positioned in the respective shaft 190. Thus, the tube 224 preferably is positioned along the axial centerline of the respective shaft 160.

During assembly of the illustrated transmission 120, each of the tubes 224 is inserted into a bore in the respective shaft after being assembled to the port fitting 230. This mounting arrangement results in the tubes 224 being restrained against substantial axial or rotational movement relative to the housing 140. As illustrated, the tubes 224 are somewhat cantilevered between the shaft ends 162, 164 and the housing 140 such that some flexing of the tubes 224 is permitted to accommodate small misalignments. In the illustrated arrangement, the pins 228 secure the tubes 224 to the fittings 230 and the pin and fitting assemblies secure the tubes 224 against substantial rotation relative to the housing 140 while allowing some pivotal play to facilitate insertion and alignment. Additionally, the pins 228 limit axial movement of the tubes 224 to very low amounts and may be used to completely prevent such movement.

During operation of the transmission 120, if the tubes 224 are not perfectly concentrically mounted within the respective shaft, the tubes 224 will drag against portions of the bore into which they are inserted and the tubes 224 therefore are expected to wear to some degree over time. Thus, the clearance between the tubes 224 and the bore in which they are inserted is expected to be on the order of about 0.001 inch to about 0.002 inch in the illustrated arrangement. Other clearances can be used to increase or decrease the leakage along the tubes 224. Given the relatively close tolerance, the interaction between the tube 224 and the bore create a structure that can function similar to a labyrinth seal that allows a low leakage rate without the need for sealing rings or other sealing structures. Structures such as labyrinth seals can be used and/or the tolerances can be altered, if desired, to manipulate the leakage rate. Preferably, pressurization of the fluid through the small tubes 224 provides sufficient leakage and no shaft seals are required.

A distal end 234 of the illustrated tube 224 carries a plug 236. The plug 236 generally closes off the distal end 234 of the tube 224 and, because the tube 224 is not secured to the shaft 160 but is secured to the housing 140, the tube 224 carries the thrust loading created by the high pressure hydraulic system relative to the housing 140. As such, no, or very minimal, thrust load is transferred to the shafts from the hydraulic system in the illustrated arrangement. Such an arrangement is advantageous because the bearings supporting the shafts do not need to be chosen to oppose an otherwise large thrust load and the construction of the transmission also is greatly simplified.

Figure 6:
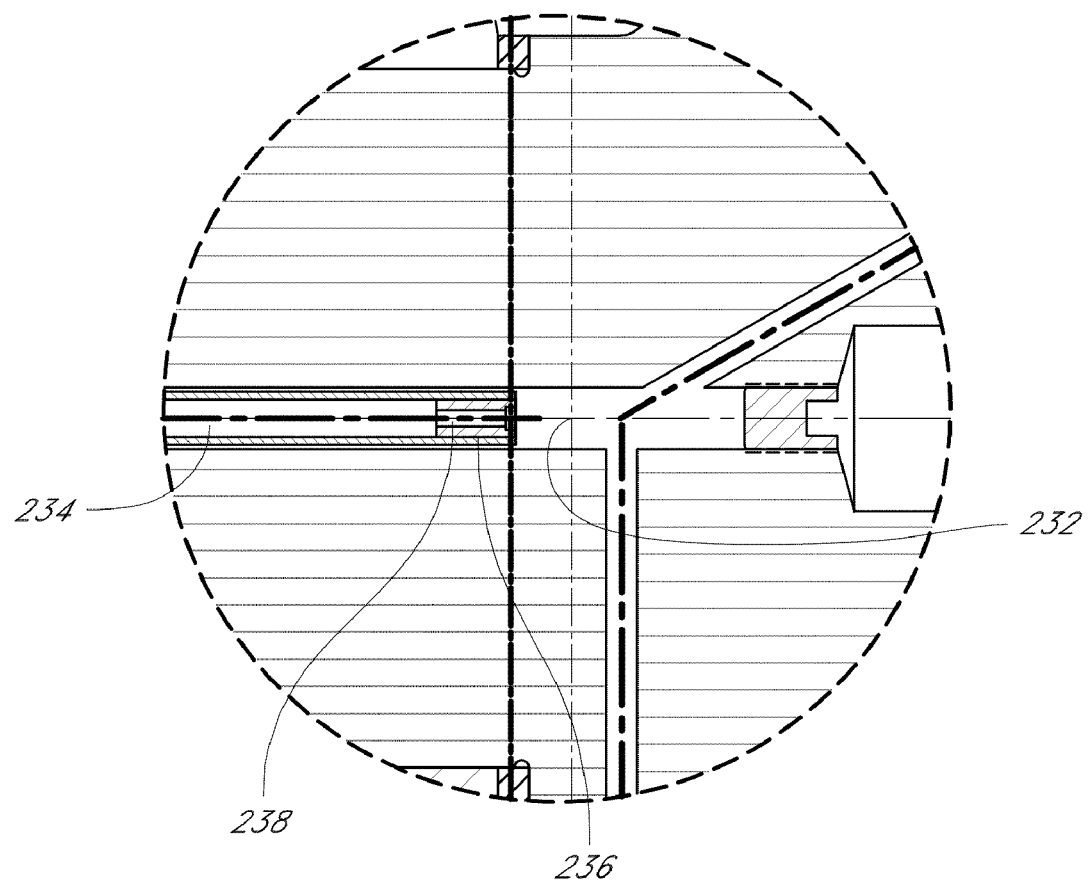
FIG. 6 is an enlarged portion of FIG. 3.

The plug 236 can comprise a through bore 238, which is best shown in FIG. 6. The through bore 238 can be sized in any suitable manner. In addition, the plug in the other pulley also can be similarly constructed. In the illustrated arrangement, the bore 238 allows the controlled passage of lubricant from the tube 224. The lubricant that passes through the bore 238 can be used to lubricant the chain 134 and/or the bearings 212, for instance. In one arrangement, the plug 236 is a set screw with an aperture extending therethrough. In this manner, the set screw can be easily replaced with other set screws featuring differently sized apertures, which allows fine tuning of the amount of leakage provided through the plug 236.

Lubricant, hydraulic oil or any other suitable fluid is transmitted from the tube 224 to the chamber 218 via cross holes 226 that penetrate the tube 224 in a region of the respective shaft 160 that contains a radial fluid passage 240 (see output shaft on FIG. 3). The fluid pressure variations that are fed into the chambers 218 via the tubes 224 are used to maintain chain clamping forces and to actuate the moveable disks 214. The radial fluid passage 240 preferably extends between the bore that contains the tube 224 and an outer diameter of the respective shaft 160. The radial fluid passage 240 is axially positioned in a location that generally corresponds to the chamber 218. In the illustrated arrangement, the dimension of the passage 240 in the axial direction of the shaft 160, which preferably is the diameter of the passage 240, is generally defined by the stroke limits of the moveable disk 214.

In the illustrated arrangement, a slot 242 provides a fluid connection between the chamber 218 and the passage 240 when the moveable pulley assembly 214 is in its position closest to the bulkhead 190 because the illustrated moveable disk 214 otherwise closes off or substantially closes off the passage. The slot 242 preferably intersects a chamfered edge 244 of the disk 214 such that the fluid communication can be maintained regardless of the angular orientation of the shaft 160.

With continued reference to FIG. 3, a small amount of fluid leakage travels down the bore along the tube 224 to lubricate the interface between the bore and the tube 224. Of this small amount of leakage, some portion exits the shaft 160 via a small passage 246. The fluid passing through the passage 246 lubricates the bearing 212. Another portion of the leakage flows in the opposite direction to lubricate the bearing 182.

Yet another portion of the leakage exits through an axial passage 248. The axial passage 248 advantageously slings fluid into the chain for lubrication and cooling.

After lubricating the bearings, the fluid will drop into a sump 250 defined within the housing 140. The housing 250 also can comprise a baffle 252 that can separate a majority of the sump 250 from the chain 134 such that foaming of the fluid can be reduced. Ports 254 are provided through which fluid pick-up tubes (not shown) can extend. The pick-ups can drain fluid from the sump 250 and return the fluid to a reservoir or the like such that the fluid can be recirculated.

Figure 7:
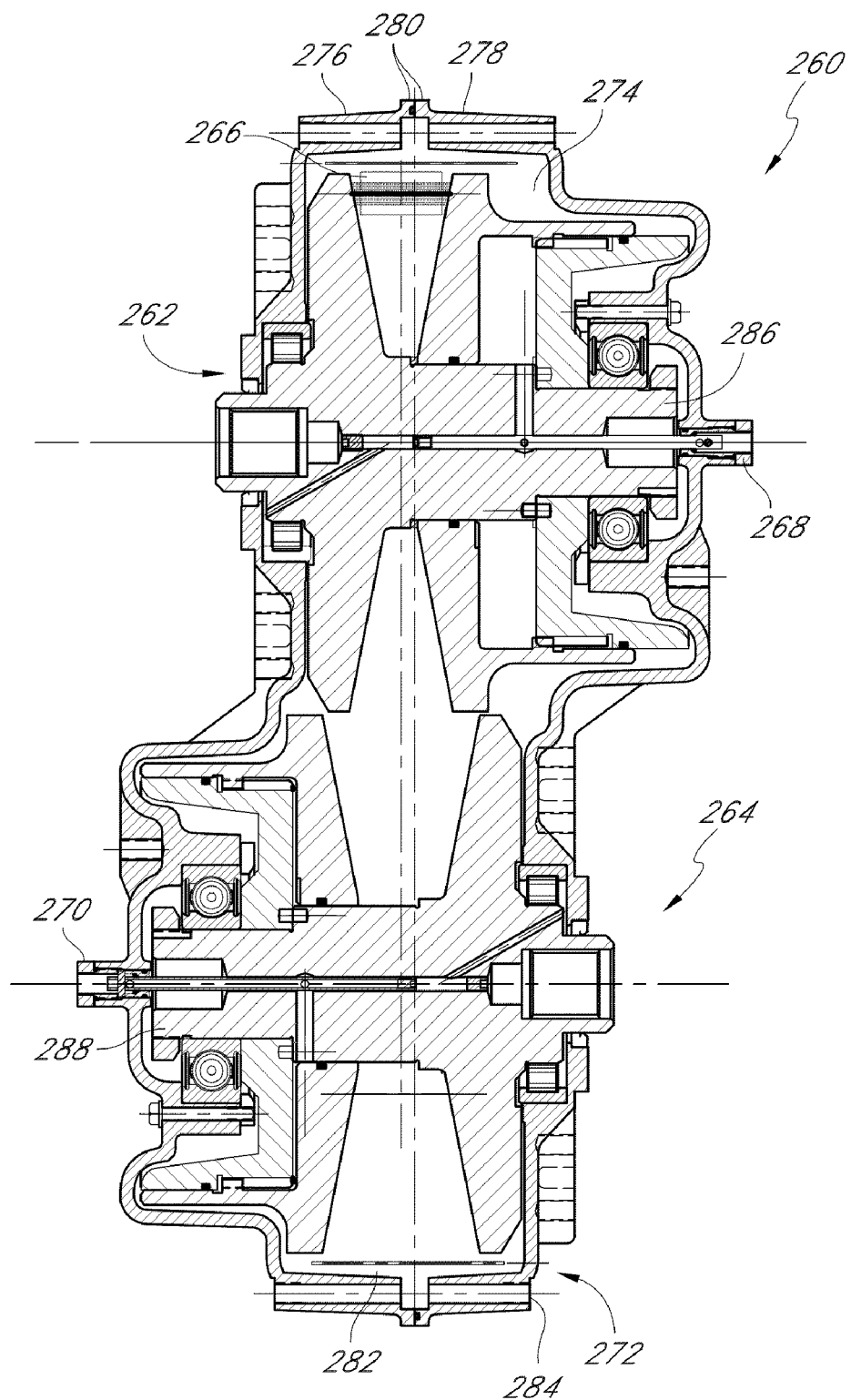
FIG. 7 is a sectioned view of another CVT module that can be the CVT module of FIG. 1.

FIG. 7 illustrates another CVT module 260 that is arranged and configured in accordance with certain features, aspects and advantages of the present invention. The CVT module 260 generally comprises an input pulley assembly 262 and an output pulley assembly 264. A chain 266 or other suitable flexible member (e.g., push belts, v-belts, etc.) connects the input pulley assembly 262 to the output pulley assembly 264. The input pulley assembly 262 and/or the output pulley assembly 264 are hydraulically actuated in any suitable manner. As such, an input pulley hydraulic connection location 268 is provided on the input pulley assembly 262 and an output pulley hydraulic connection location 270 is provided on the output pulley assembly 264.

Almost all of the moving components of the illustrated CVT module 260 are housed within an outer housing 272. In the illustrated arrangement, the outer housing 272 comprises two pieces, which are substantially identical to each other. While such an arrangement advantageously reduces manufacturing costs, other suitable configurations also can be used.

With reference to FIG. 7, the outer housing 272 preferably defines a belt chamber 274 that contains the pulley assemblies 262, 264 and the chain 266. In the illustrated arrangement, the housing 272 comprises a first portion 276 and a second portion 278 that are joined together along a flange 280. A lower portion of the housing 272 preferably defines a hydraulic fluid collector region 282 which is fluidly connected to a hydraulic fluid return port 284.

The input pulley assembly 262 is mounted on an input shaft 286 and the output pulley assembly 264 is mounted on an output shaft 288. In the illustrated configuration, the input shaft 286 and the output shaft 288 are integrally formed with a portion of the respective pulleys but other configurations also can be used.

A computer controlled hydraulic actuation system for chain clamping and for shifting functions of the CVT module 260, which are preferably integrated with the vehicle engine and other sensors, can be accomplished in any suitable manner.

Figure 8:
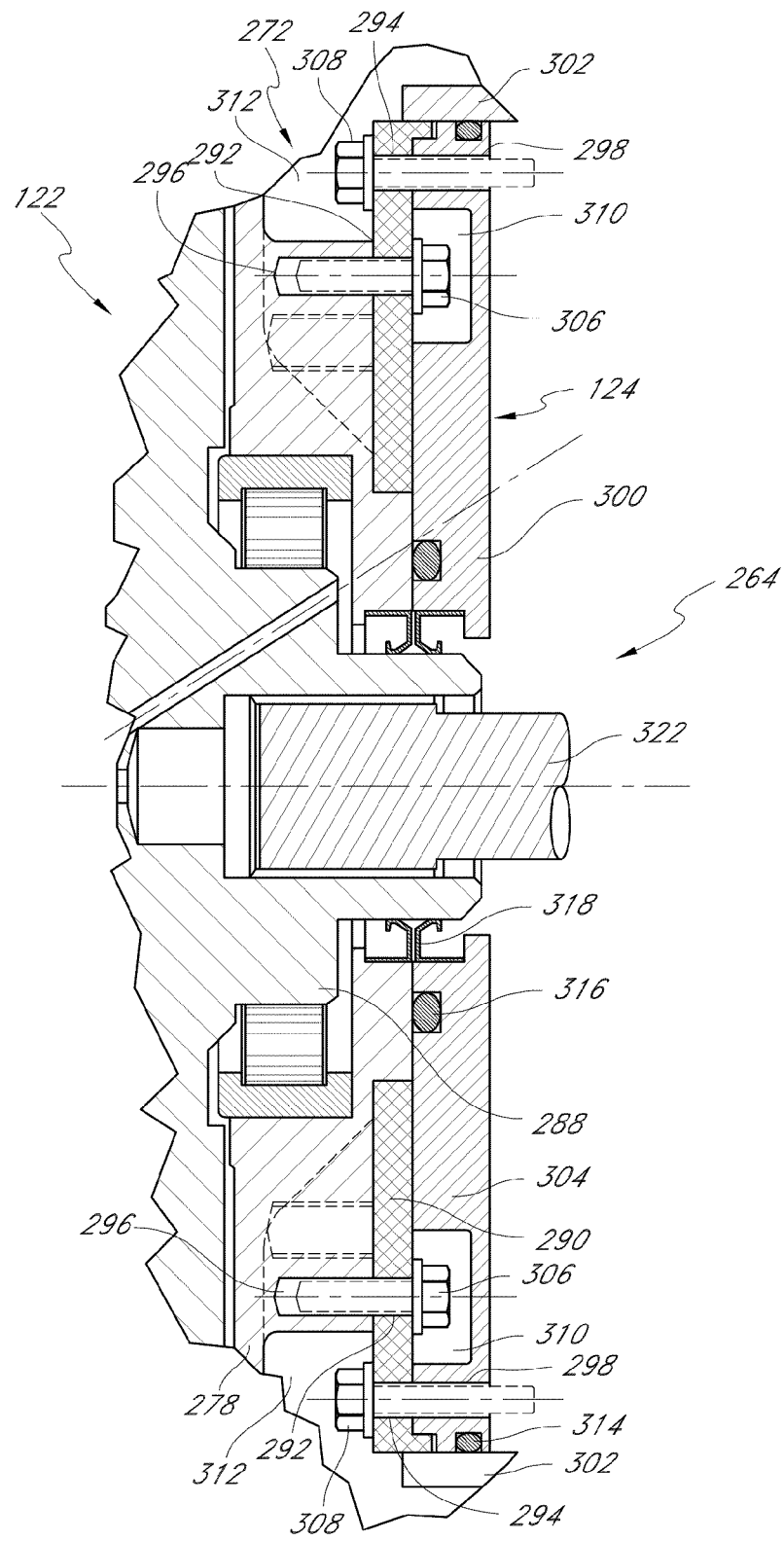
FIG. 8 is a sectioned view of a sandwiched adaptor plate that can be used to connect together the CVT module and the planetary module.
Figure 11:
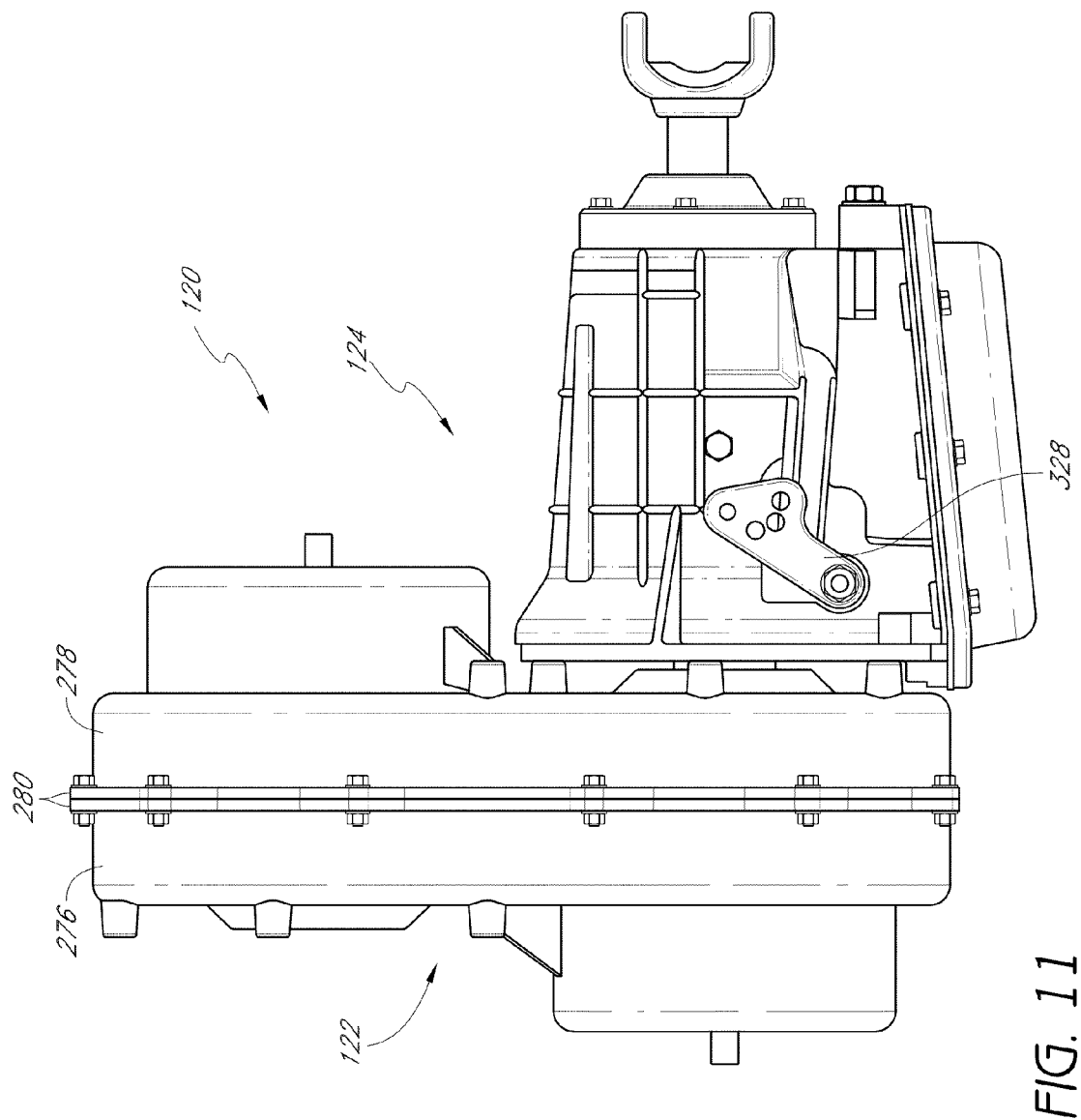
FIG. 11 shows another external view of the modules connected together with a common oil reservoir, an input shaft, an output shaft and a vertical offset between the input shaft and the output shaft.
Figure 12:
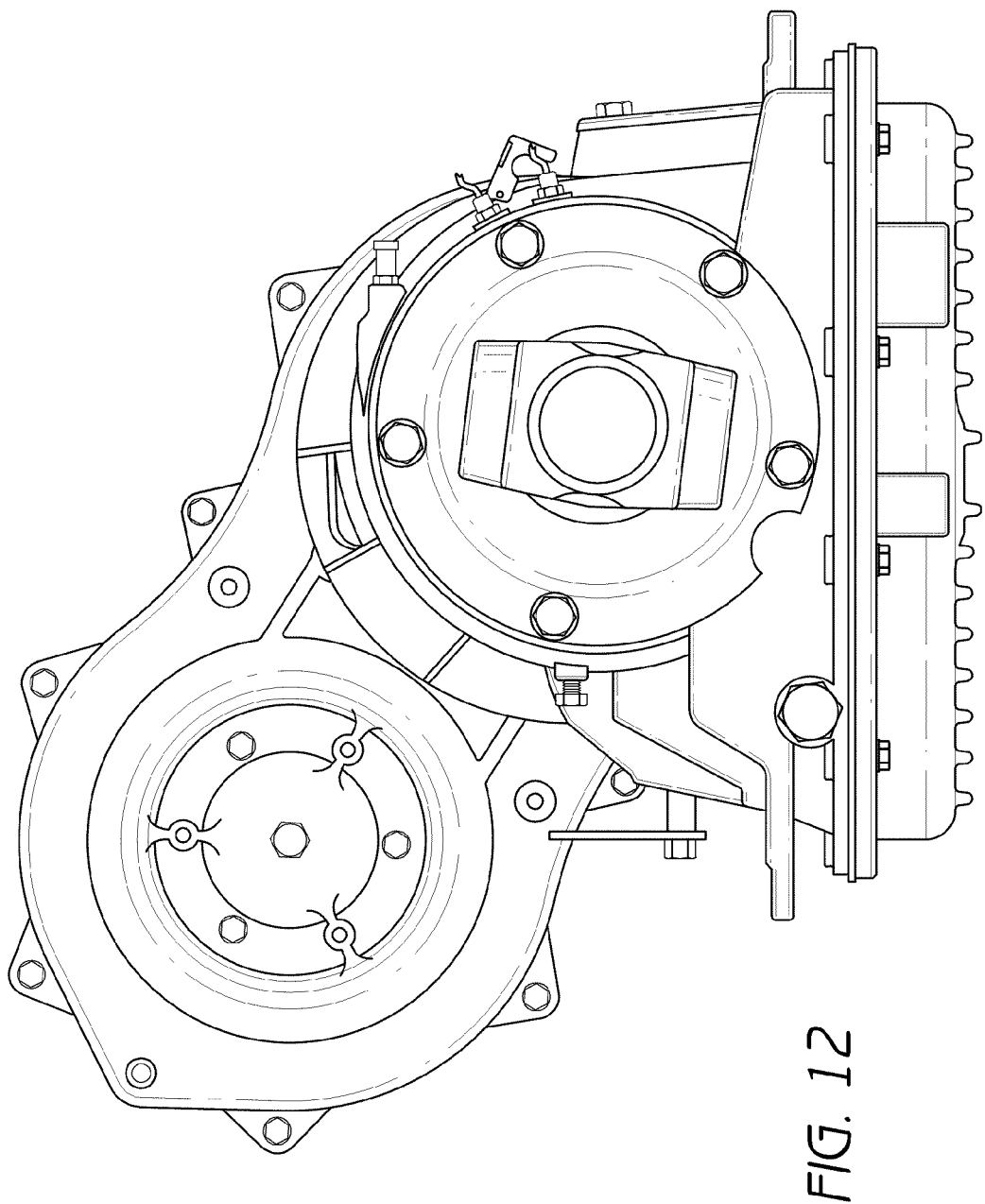
FIG. 12 shows another external view of the modules connected together with the CVT module offset at an angle relative to a horizontal orientation.

The CVT module 260 preferably is coupled to the planetary module 124. With reference now to FIG. 8, an adaptor plate 290 has been developed to couple the CVT module 122, 260 to the planetary module 124. The two modules can be coupled together in any desired orientation. For instance, comparing FIG. 11 and FIG. 12, two different orientations as presented (i.e., FIG. 11 shows the CVT module extending straight upward while FIG. 12 shows the CVT module extending upward at about 30 degrees above horizontal). Thus, the illustrated transmission provides an exceptionally high degree of flexibility for installations.

The adaptor plate 290 can be provided with a first group of holes 292 and a second group of holes 294. The first group of holes 292 aligns with threaded bores 296 formed in the housing 140, 272 of the CVT module 122, 260 while the second group of holes 294 aligns with threaded bores 298 formed in a portion of a housing 300 of the planetary module 124. In particular, the planetary module 124 preferably comprises an outer housing 302 with a front plate 304 that is received within the outer housing 302. The first group of holes 292 receives a first set of fasteners 306 and the second group of holes 294 receives a second set of fasteners 308. It should be noted that the fasteners and holes in FIG. 8 are shown out of position for clarity of the figure. Any suitable fastener pattern can be used and any suitable fastening technique or members can be used.

In the illustrated configuration, the portion of the planetary module housing 300 discussed above (i.e., a front plate of the housing) advantageously comprises recesses 310 defined in locations that correspond to the first set of fasteners 306. During assembly, the adaptor plate 290 can be joined to the CVT module 122, 206 using the first set of fasteners 306. The first set of fasteners 306 are accommodated within the recesses 310 when the planetary module 124 is brought into registry with the adaptor plate 290. The second set of fasteners 308 can secure the planetary module 124 to the adaptor plate 290. One or more recesses or gaps 312 can be provided on the exterior of the CVT module 122, 260 to facilitate tightening of the second set of fasteners 308.

A first seal 314 preferably is positioned between the planetary outer housing 302 and the planetary front plate 304. A second seal 316 preferably is positioned between the front plate 304 and the adaptor plate 290. In one configuration, such as the illustrated embodiment, dynamic shaft seals 318 can be used to seal the opening through which the output shaft 288 of the CVT module 122, 260 extends for coupling to the planetary module 124. If interhousing leakage is desired, however, the dynamic shaft seals 318 can be omitted. Advantageously, the adaptor plate 290 and the associated seals 314, 316 can reduce or eliminate leakage of fluids to the outside of the transmission 120.

The planetary module 124 comprises the housing 302 that is introduced above. The housing 302 can be formed of any suitable material and in any suitable way. In one configuration, the housing 302 is formed of aluminum. The housing 302 can be die cast in some more advantageous embodiments. A fluid reservoir 320 can be defined in a lower portion of the housing 302. In other embodiments, the fluid reservoir can be secured to the housing 302 or can be a separate component that is connected with fluid transfer members (e.g., pipes).

The planetary module 124 comprises an input shaft 322. The input shaft 322 can have any suitable configuration. Preferably, the input shaft 322 of the planetary module 124 is directly coupled to the output shaft 288 of the CVT module 122, 260. In one configuration, the two shafts 322, 288 are splined together.

In the illustrated embodiment, the input shaft 322 connects to a strengthened planetary gearing assembly 324, such as that used in drag racing. The planetary gearing assembly 324 connects to an output shaft 326. For example, a planet carrier can be coupled to the output shaft 326. The operation of the planetary gearing assembly 324 of a Powerglide transmission is well known and is described in detail, together with drag racing modifications, in Munroe, Carl H., Powerglide Transmission Handbook, How to Rebuild or Modify Chevrolet's Powerglide for All Applications, by Carl H. Monroe, HPBooks 2001, published by The Berkley Publishing Group, A division of Penguin Putnam Inc., 375 Hudson Street, New York, N.Y. 10014, which is hereby incorporated by reference in its entirety.

Figure 9:
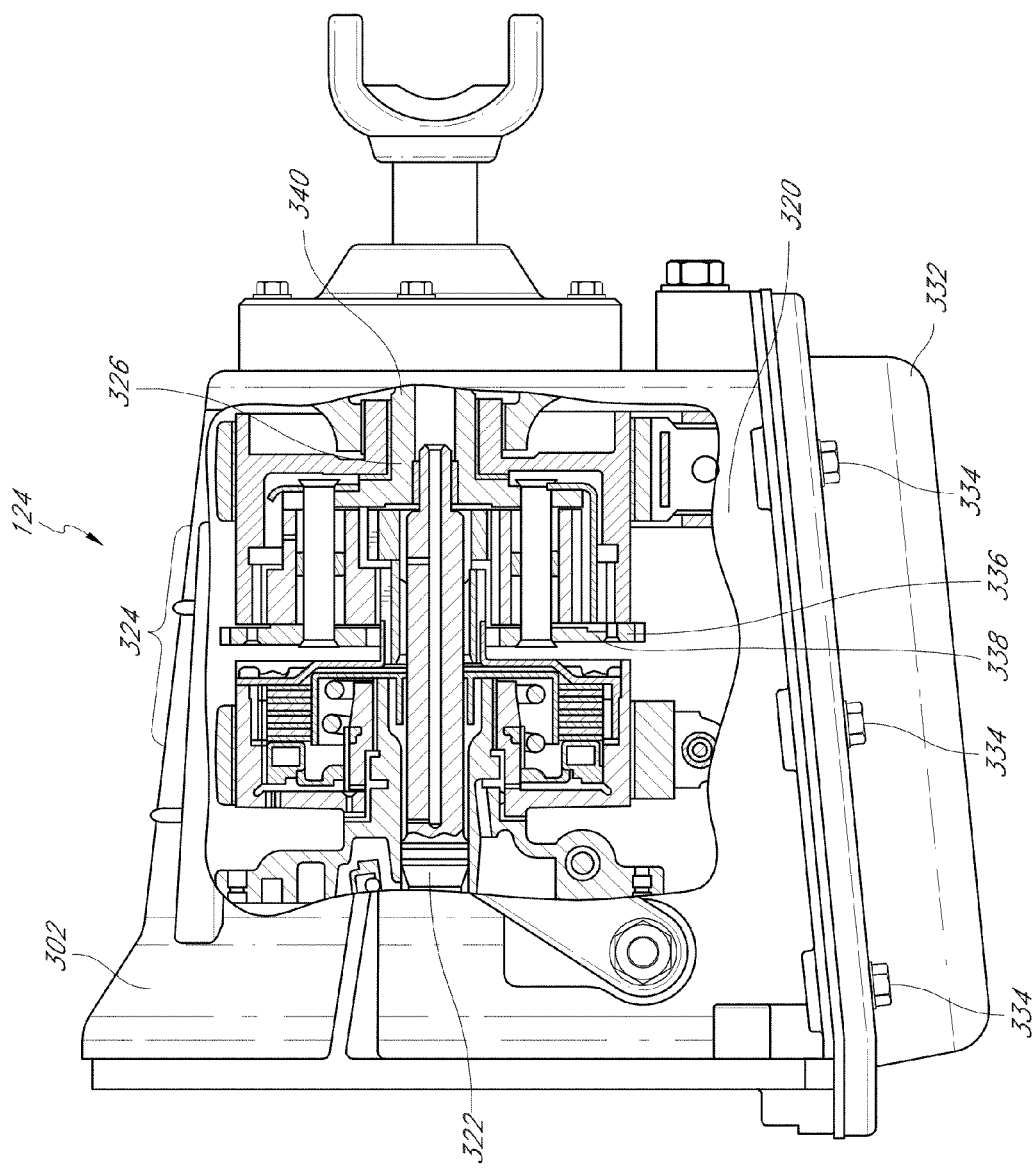
FIG. 9 shows a partially sectioned view of a planetary module that can be the planetary module of FIG. 1.

With reference to FIG. 11, a side view of the opposite side of the transmission 20 relative to that shown in FIG. 9 illustrates a shift actuator 328. The shift actuator 328 is connected to a selector valve 330 (i.e., manual valve) through any suitable connection. In the illustrated configuration, the stock selector valve was replaced by a modified selector valve 330 for reasons that will become apparent. In some embodiments, the shift actuator 328 can be connected to the selector valve 330 with a cable, rod or the like. The selector valve 330 can comprise a 5 position spool valve operated by a shift lever via the shift actuator 328. A schematic of such a valve 330 can be found in FIGS. 19(*a*)-19(*e*). As shown in FIGS. 19(*a*)-19(*e*), when the selector valve 330 is slid to different positions, the selector valve 330 covers or exposes different passageways in a valve body 332 in which it is positioned. Thus, the selector valve 330 directs fluid to any of a number of circuits. The custom selector valve 330 simplifies and reduces the number of circuits used by the modified transmission, which circuits will now be discussed.

FIGS. 19(a)-19(e) schematically illustrate that the selector valve 330 that can be used to direct hydraulic fluid to a high clutch pack, a reverse clutch pack and a low brake band, which are found in Powerglide transmissions. The supply of fluid to the valve body 332 will be explained in greater detail below. In the illustrated arrangement, the valve body 332 is secured to the housing 300 using threaded fasteners 334. Other arrangements are possible.

In park, a parking pawl 336 (see FIG. 9) secures the output shaft 326 against rotation by engaging with teeth machined in an outer surface of the planetary carrier or a parking gear 338 that is secured in any suitable manner to the output shaft 326. Such a parking gear in the context of a Powerglide transmission is shown and described in U.S. Pat. No. 2,865,227, issued Dec. 23, 1958, which is hereby incorporated by reference in its entirety. One embodiment of a suitable parking pawl mounting assembly is specifically shown in FIG. 5 of the '227 patent. Other constructions are possible.

Figure 19A:
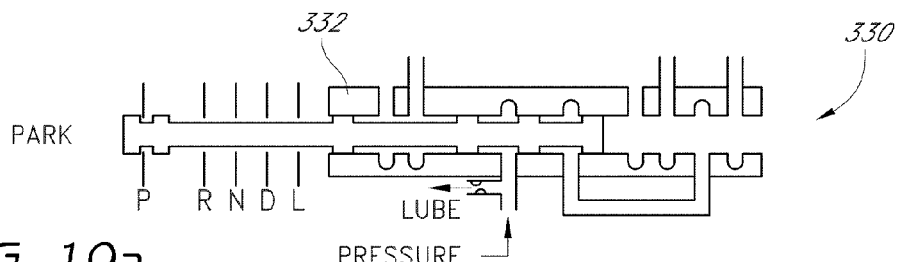
FIGS. 19a-19e are hydraulic circuit schematic diagrams of a selector valve used in a planetary module.
Figure 19B:
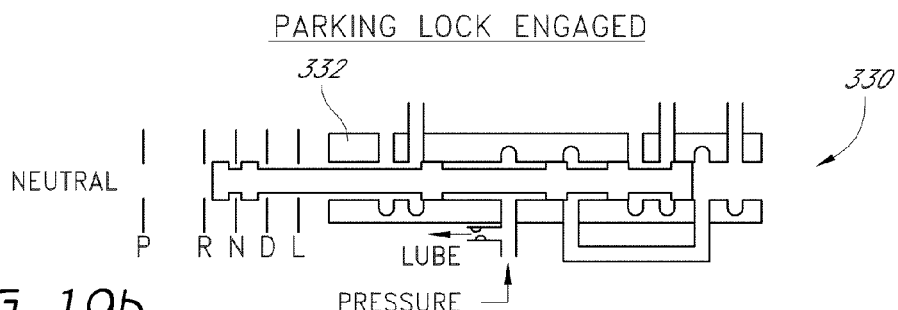
Figure 19C:
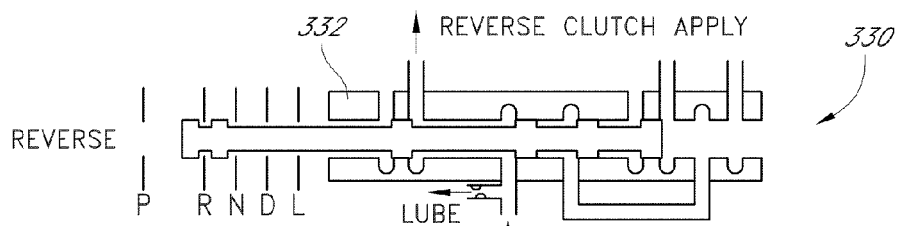
Figure 19D:
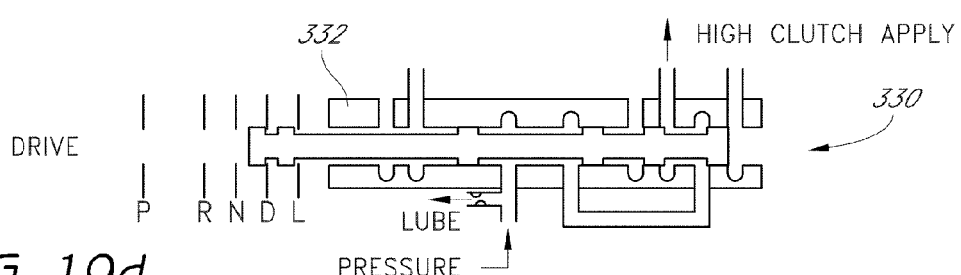
Figure 19E:
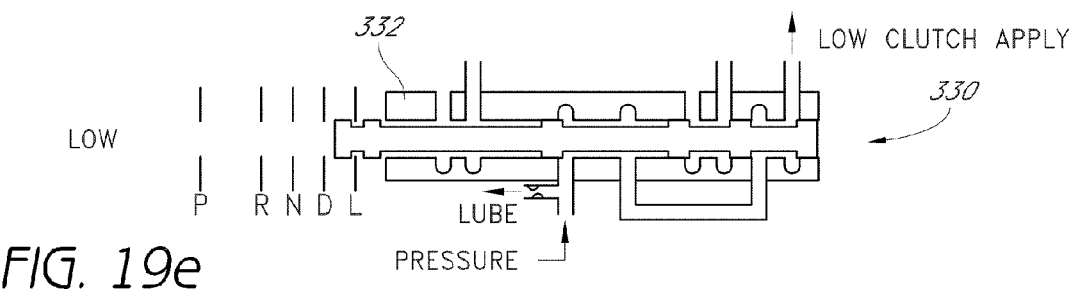

As shown in FIG. 19(a) of the present application, when the selector is in the P, or Park, position, the valve 330 is not directing fluid volume to either clutch pack or to the brake band and, preferably, the parking pawl 336 is engaging the parking gear 338. The fluid can only flow to the lube port (identified as LUBE) in this position. The fluid flowing through the lube port is directed in any suitable manner to transmission components requiring lubrication.

In neutral, the parking pawl 336 is disengaged from the parking gear 338, which allows the output shaft 326 to freewheel. The valve 330 (see FIG. 19(b)) is not directing fluid to either clutch pack or to the brake band. Thus, as with park, when the selector is in the N, or neutral, position, the fluid volume is only delivered to the lube port in this position.

In reverse, the parking pawl 336 is disengaged, which allows the output shaft 326 to freewheel. The valve 330 (see FIG. 19(c)), when the selector is in the R, or reverse, position, directs fluid volume to the reverse clutch pack, which causes the reverse clutch to be applied. The rotation of the input shaft 322 is applied to the output shaft 326 through a gear train that generally reverses the direction of rotation while also slightly reducing the rotational speed. Advantageously, by having a reverse gear in the planetary module 124, the transmission 120 can ensure that the CVT module 122 need only operate in one direction, which causes the chain to pull in only one direction thereby extending the chain life.

In drive, the parking pawl 336 is disengaged, which allows the output shaft 326 to freewheel. The valve 330 (see FIG. 19(d)), when the selector is in the D, or drive, position, directs fluid volume to the high clutch pack, which causes the high clutch to be applied. With the high clutch applied, the planetary set locks up (because the input sun gear and the input ring gear preferably are coupled to the input shaft) and the planetary carrier rotates together with the input shaft 322, which occurs at the same rotational speed as the input shaft. The rotation of the planetary carrier is coupled to the output shaft 326. Thus, a 1 to 1 planetary high gear ratio is provided.

In low, the parking pawl 336 is disengaged, which allows the output shaft 326 to freewheel. The valve 330 (see FIG. 8(e)), when the selector is in the L, or low, position, directs fluid volume to a low servo piston, which applies the band. When the band is applied, the planetary transmission module operates in low, in manners that are well understood. A gear reduction on the order of about 2 to 1 is thereby achieved.

The output shaft 326 preferably comprises a universal joint 340. The universal joint 340 can be connected to the output shaft 326 with splines in some configurations. Other suitable techniques for joining the output shaft 326 and the universal joint 340 also can be used.

Figure 10:
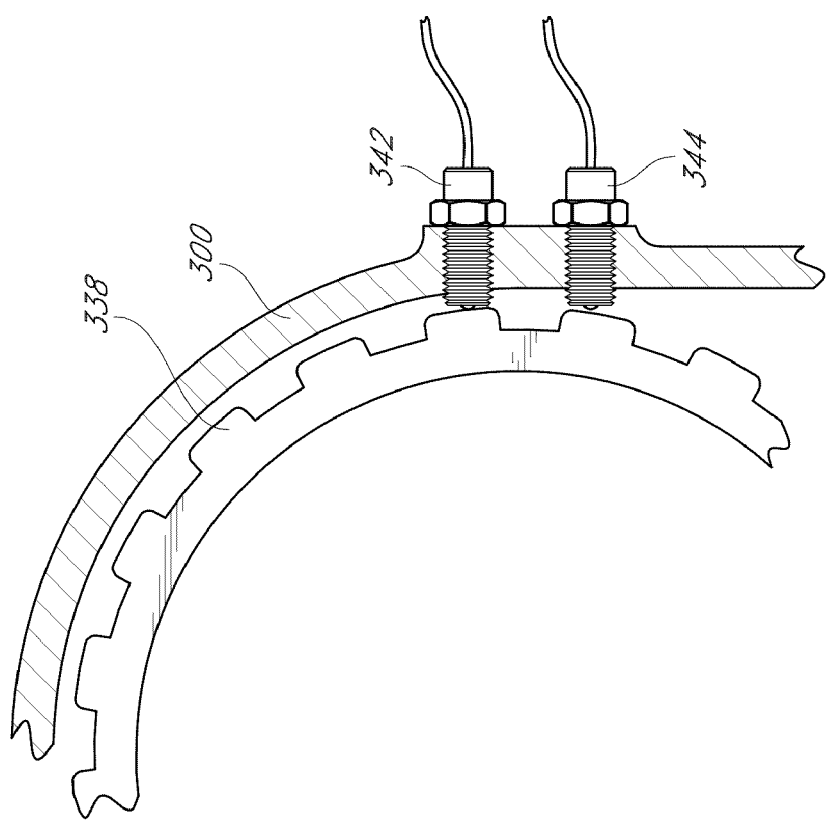
FIG. 10 shows an enlarged sectioned view of the planetary module and illustrates an odometer electrical pulse generator, a speedometer electrical pulse generator and the proximity of the pulse generators to a parking lock gear of the planetary module.

With reference to FIG. 10, the transmission 120 preferably also comprises an odometer transmitter 342 and a speedometer transmitter 344. Suitable transmitters can be obtained from Red Lion Controls of York, Pa. The transmitters 342, 344 preferably extend through the housing 300 at a position adjacent to the parking gear 338. As discussed above, the parking gear 338 preferably is joined to the output shaft 326 and turns at the same speed as the output shaft 326. Thus, the speedometer transmitter 344 and the odometer transmitter 342 can be provided with a true reading of the output shaft speed. The output shaft speed can be transmitted to suitable controllers and the information can be used to display on a suitable odometer and on a suitable speedometer. Other constructions also can be used.

As discussed above, the planetary module 124 comprises a reservoir 320. The reservoir 320 advantageously defines a common reservoir such that the CVT module 122 and the planetary module 124 use the same fluid, which drains back into the reservoir of the planetary module 124. In some configurations, the common reservoir 320 can be positioned in the CVT module 122. In one configuration, the common reservoir 320 is positioned externally of the CVT module 122. In other configurations, the common reservoir 320 can be positioned externally of both modules.

Pressurized hydraulic fluid is taken from the common reservoir 320 for shift clutch and band operation of the planetary module 124 (via the valve body 332) as well as for a ratio changing and clamping control system for the CVT module 122. In particular, pressurized fluid for the planetary module 124 is used to operate the high clutch and the reverse clutch, to apply the brake band as well as for lubrication and cooling. The planetary module 124 requirement amounts to approximately 0.25 gallons per minute at a pressure on the order of 200 psi. The oil supplied to the planetary module drains back into the reservoir 320.

Figure 13:
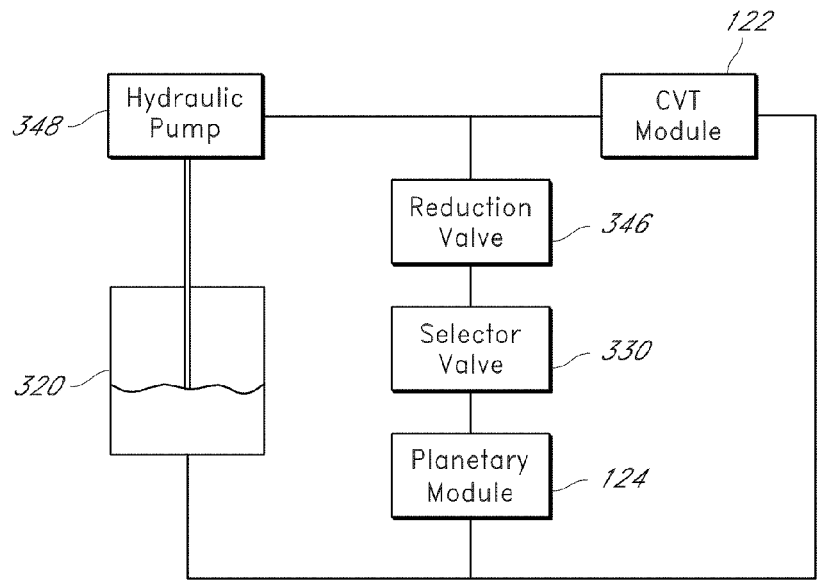
FIGS. 13 and 14 are two schematic representations of fluid supply paths that deliver fluid to both modules.

As discussed above, the CVT module 122 uses fluid pressure to create changes in gear ratios. In one embodiment, such as that shown in FIG. 13, pressurized oil can be supplied to the planetary module 124 by tapping into the hydraulic circuit of the CVT module 122. The circuit for the CVT module 122 generally maintains a pressure higher than that needed by the planetary module 124. Such a construction could use a pressure reduction valve 346 to drop the pressure before the circuit connects with the planetary module 124. The pressure preferably would be dropped to about 200 psig. The flow capacity of a CVT pump 348 may be adjusted as necessary to provide ample flow to service both modules 122, 124. This method reduces the complexity of the overall system by eliminating separate motors and/or pumps to supply fluid to the hydraulic systems of the two modules 122, 124. On the other hand, this method would likely require more energy during operation, which is evidenced by the pressure reduction performed before introducing the fluid from the CVT hydraulic circuit into the planetary hydraulic circuit.

Figure 14:
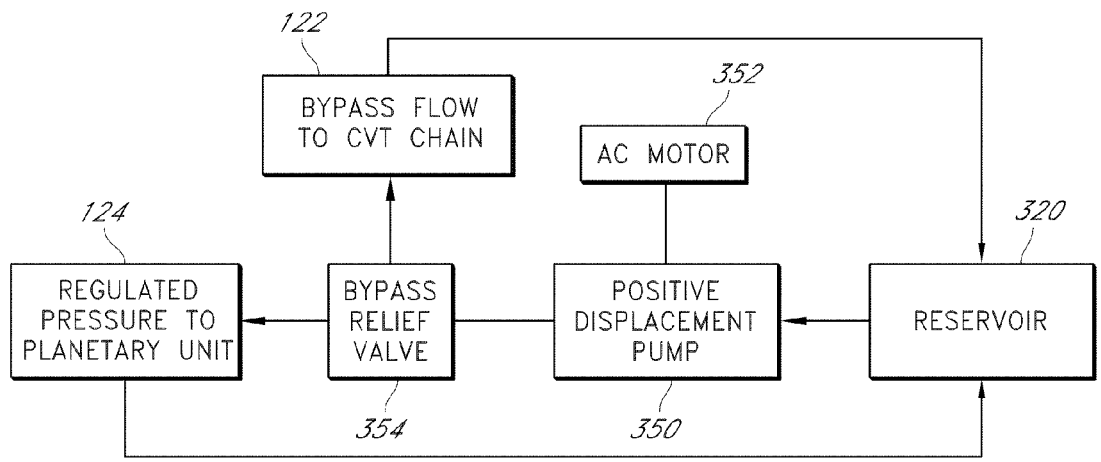

In another configuration, shown in FIG. 14, the fluid can be supplied by a positive displacement gear or any other suitable pump 350, including those driven by an alternating current electric motor 352 that runs at a constant speed and that does not require other controls. It is projected that the pump 350 will produce about 0.5 gallons per minute, which is twice the average need of the planetary module 124. The discharge line of the pump 350, therefore, preferably incorporates a relief valve 354 that will bypass excess flow while holding a substantially constant pressure that is delivered to the planetary unit 124. The excess flow of approximately 0.25 gallons per minute also can be routed to the CVT module 122 such that it can be sprayed on the chain 134 for lubrication and cooling and then be returned by gravity to the reservoir 320. If intermittent demand for oil by the planetary module 124 exceeds the estimated 0.25 gallons per minute, such as may be possible during gear shifting, the relief valve 354 can hold the pressure at the temporary expense of the bypass flow to the CVT module 122. The net energy consumed at the stated flow and pressure is on the order of about 0.075 horsepower, not accounting for overall pumping inefficiencies (56 watts).

The stated torque, ratio spread and specific low and high gear ratio values, etc. expressed within this discussion are nominal and can vary depending upon the application. In one preferred application, the CVT module 122 can accept about 800 Newton meters (590 ft. lbs.) of input torque and can have a low ratio of about 2.5 to 1. The output torque can be as much as about 2000 N.m. Thus, the planetary module 124 preferably is designed to accept about 2000 Newton meters (1475 ft. lbs.) of torque from the variator. In its low ratio of about 2 to 1, the planetary module 124 can produce a drive shaft torque of about 5 times the variator input torque (i.e., about 4000 Newton meters (2950 ft. lbs.)). With both modules operating in the high range, the overdrive ratio is about 0.4 to 1.0 with the variator efficiency as high as about 95% and no planetary gears in operation. Thus, the combination results in an overall ratio spread of about 7.5 to 1 and provides a mechanically complete multifunctional transmission that can be operated in accordance with any suitable computerized hydraulic CVT controller. In some applications, the transmission 120 can be connected to a torque converter or a mechanical clutch at the input shaft.

Figure 24:
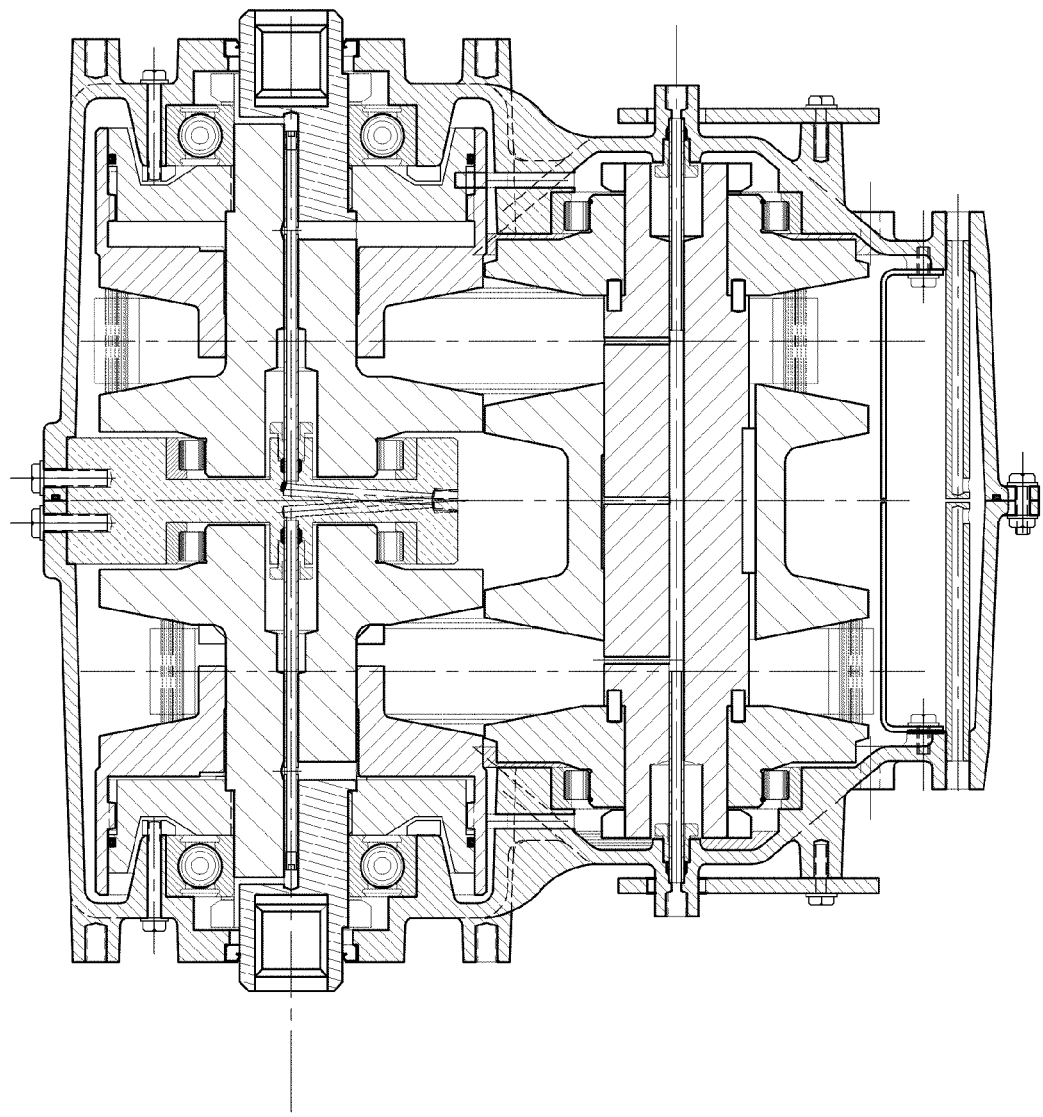
FIG. 24 is a sectioned view of a dual chain CVT module that can be mated to a planetary module.

Advantageously, the CVT module 122 and the planetary module 124 can be separated as complete units for maintenance or repair necessities. In addition, the planetary module 124 described above is not limited to a single specific use. For example, the illustrated planetary module 124 can mate with a dual chain single function CVT such as that shown in FIG. 24 and such as that shown in U.S. Pat. No. 11/032,924, filed on Jan. 11, 2005, which is hereby incorporated by reference in its entirety.

Figure 15:
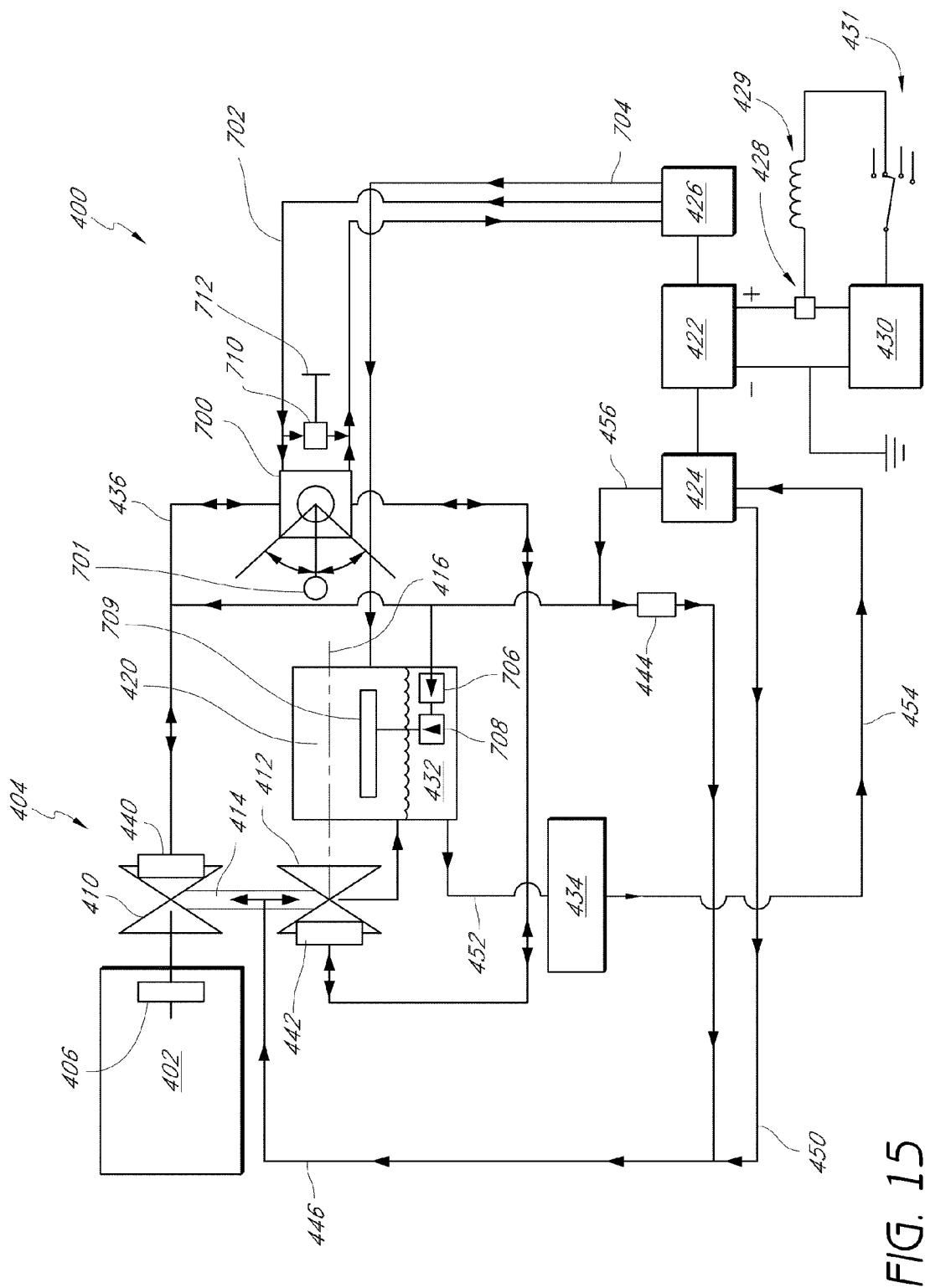
FIG. 15 is a more detailed schematic representation of a transmission control configuration that can be implemented in the transmission of FIG. 1.

With reference now to FIG. 15, FIG. 15 illustrates a CVT system control 400. The illustrated system control 400 provides a simplified and preferably substantially electronic free method of pressurizing and providing variable pressure control of a hydraulic system in a belt or chain drive continuously variable transmission. In the illustrated system control 400, two separate functions are controlled: chain clamping and cylinder pressure manipulation. In particular, variable system pressure control is provided for chain clamping, and other use, and differential cylinder pressure manipulation is provided for changing the CVT engine/drive line ratios when fluid passes from one cylinder to the other cylinder. The cylinder pressure manipulation changes CVT engine/drive line ratios when fluid passes from in either direction between cylinders.

In the illustrated configuration, an engine 402 has an output shaft that drives a continuously variable transmission (CVT) 404 through a torque converter 406. The CVT 404 comprises a primary sheave 410 and a secondary sheave 412. A flexible member 414, such as a belt or a chain, for example, connects the primary sheave 410 and the secondary sheave 412. The secondary sheave 412 preferably drives an output shaft 416 through a planetary transmission 420. The planetary transmission 420 can provide functions such as low gear, reverse gear and parking. Other configurations are possible.

The illustrated system 400 uses a single motor 422 to power components of the control system 400. The motor 422 preferably is an electric motor that drives two separate pumps 424, 426. Other types of motors can be used. The motor 422 also preferably receives power from a 12 volt power source 430. While the power source 430 can be a 12 volt power source, in some embodiments the power source 430 can be a 40 volt power source or some other voltage power source. In some embodiments, the motor 422 is an electric motor driven by a battery. In some preferred embodiments, the power is supplied to the motor 422 from the vehicle system battery 430, which is directly connected to the motor 422 by single purpose wires that can carry high motor amperes and that are not associated with the vehicle electrical system. The motor 422 can be energized by a relay switch 428 in the positive (+) leg from the battery 430. A relay coil 429 can be energized by an ignition switch 431 so that the system is operating before engine start. The coil 429 preferably requires only about 0.2 amperes for its operation. The motor 422, on the other hand, typically will require on the order of 40 amperes for its operation. The relatively constant volume, which is less subject to variations that may be experienced in engine driven pumps, supplies all of the necessary fluid for transmission function at all engine speeds. Thus, such a system reduces the likelihood of excess volume and energy losses that occur at higher engine speeds in engine-driven pump configurations.

The two pumps 424, 426 preferably comprise the first pump 424, which controls chain clamping, and the second pump 426, which controls cylinder pressure manipulation to effect drive ratio changes. The pumps 424, 426 can be vane pumps, gear pumps, or any other suitable pump that can draw oil from a reservoir 432. Preferably, the pumps 424, 426 are positive displacement pumps. More preferably, the pumps 424, 426 are driven at a relatively constant and relatively continuous speed to displace a relatively consistent volume at all times. In other words, the relatively consistent volume preferably is not subject to variations caused by changes in engine speed, such as would be experienced with engine driven pumps. Thus, the pumps 424, 426 greatly reduce, or eliminate, excess volume and energy losses that occur at the higher engine speeds in engine driven systems, which fluctuate with engine speed.

As illustrated, the first pump 424 is driven by the motor 422. The first pump 424 draws fluid from the reservoir 432. In the illustrated configuration, the first pump 424 is connected to the reservoir 432 through a heat exchanger 434. Thus, fluid is drawn from the reservoir 432, through the heat exchanger 434 and into the first pump 424.

Fluid flowing out from the first pump 424 is directed under pressure to a passage 436 that connects cylinders 440 of the primary sheave 410 to cylinders 442 of the secondary sheave 412. The pressurized fluid within the passage 436 establishes a clamping force for both of the sheaves 410, 412. In order to establish and generally maintain a desired pressure within the passage 436, a pressure relief valve 444 can be fluidly connected to the passage 436.

In some embodiments, the pressure relief valve 444 is a spring-loaded relief valve that serves as an upstream pressure regulator. Thus, the pressure relief valve 444 can bypass excess pump flow and maintain a controlled baseline pressure that is delivered to the cylinders. The pump and electric motor combination preferably is sized so that there is always at least a small amount of excess flow and such that the pump and the electric motor will be operating continuously. In some embodiments, the excess pump flow is bypassed to a lubrication passage 446. The flow through the lubrication passage 446 can be directed onto the flexible member 414 for lubrication and cooling.

In addition to the bypass flow from the pressure relief valve 444, internal leakage from the first pump 424 can be directed into the lubrication passage 446. For example, a case return from the first pump 424 can be connected to the lubrication passage 446 through an auxiliary passage 450. Fluid used to lubricate the flexible member 414 returns to the reservoir 432.

From the reservoir 432, the fluid is drawn through a first suction passage 452 into the heat exchanger 434. The fluid is further drawn through a second suction passage 454, which preferably fluidly connects the heat exchanger 434 to a suction port of the pump 424.

As discussed above, the pump 424 supplies fluid to the cylinders 440, 442 to provide the base clamping force. The pump 424 preferably supplies the fluid through a supply line 456, which connects to the passage 436 that connects the cylinders 440 of the primary sheave 410 to the cylinders 442 of the secondary sheave 412. Desirably, the clamping force is adjustable depending upon operator demands. Thus, the pressure relief valve 444 helps to adjust the pressure within the system, whereby the clamping force can be adjusted. Generally, the clamping force is modulated in accordance with torque loads to reduce the likelihood of, or to prevent, the chain or belt from slipping under high torque conditions but without applying unnecessary forces that would increase chain wear under low torque conditions.

Figure 16:
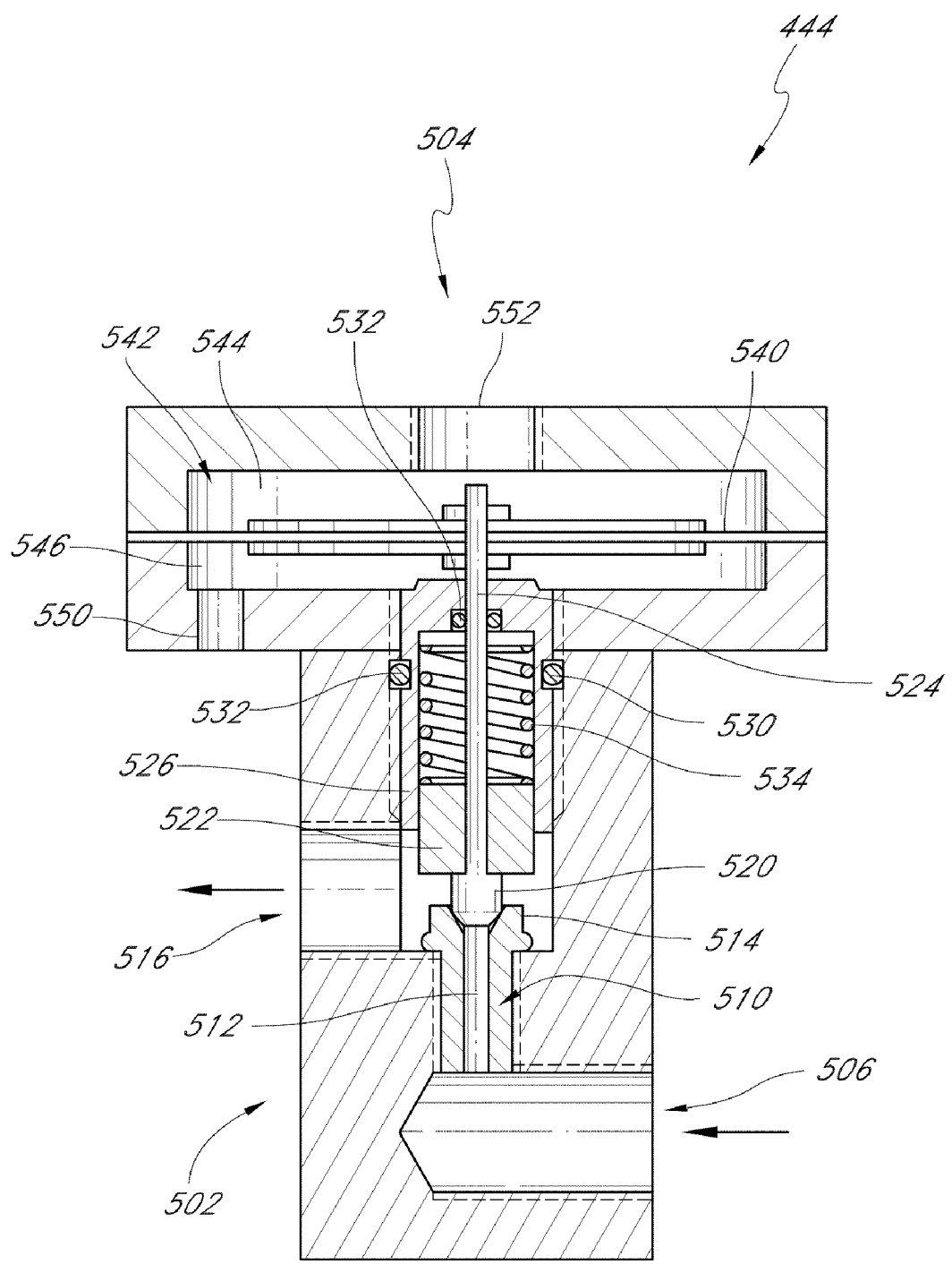
FIG. 16 is a sectioned view of a relief valve that mechanically adjusts a bypass flow to adjust clamping forces in a CVT module.

FIG. 16 illustrates an embodiment of the relief valve 444. The illustrated relief valve 444, as will be explained, can incorporate an integral diaphragm actuated override device that is connected to the engine intake manifold pressure to modulate any preset relief valve pressure. The illustrated relief valve 444 comprises a valve portion 502 and an adjustment portion 504. The adjustment portion 504 advantageously is connected (e.g., mechanically connected) to the valve portion 502 such that the adjustment portion 504 can adjust the valve portion 502 in manners that will be described.

The valve portion 502 comprises an inlet port 506. A valve body 510 is fluidly connected to the inlet port 506. The valve body 510 can be a threaded insert that can be positioned in a passage that is fluidly connected to the inlet port 506. Other configurations are possible.

The valve body 510 preferably comprises a through passage 512. An upper portion of the valve body 510 can comprise a valve seat 514. The valve seat 514 can be a tapered surface or the like. An outlet port 516 fluidly connects to the through passage 512 with the valve seat being positioned between the inlet port 506 and the outlet port 516. In some constructions, the outlet port 516 connects to the lubrication passage 446, which provides a bypass outlet.

A lower and/or outer surface of a valve member 520 can rest against the valve seat 514. In some configurations, the valve member 520 comprises an outer surface that is tapered and that can interface with the valve seat 514. In some configurations, the tapering of the outer surface of the valve member 520 is different from the tapering of the corresponding surface of the valve seat 514. The valve member 520 can affect flow between the inlet port 506 and the outlet port 516.

A bushing 522 abuts an upper end of the valve member 520 and preferably is mounted on a stem 524 of the illustrated valve member 520. The bushing 522 can provide an enlarged surface that can slide along an inner surface of a sleeve 526. The sleeve 526 can thread into a bore formed in the valve portion, for example.

In some configurations, an interface between the sleeve 526 and the surrounding body can be sealed, such as with an o-ring 530 or the like. Similarly, an interface between the sleeve 526 and the stem 524 can be sealed, such as with an o-ring 533 or the like.

A spring 534 or other suitable biasing member can be positioned between the bushing 522 and a portion of the sleeve 526, for example, such that the valve member 520 is biased toward the valve seat 514. The biasing force of the spring 534 establishes a base line pressure between the valve seat 514 and the valve member 520.

The stem 524 is connected to the adjustment portion 504. In particular, the stem 524 preferably is connected to a diaphragm member 540. The diaphragm member 540 preferably separates a chamber 542 into an intake side 544 and a vent or ambient side 546. The vent side 546 comprises one or more vent ports 550 that place the chamber 542 in fluid communication with the ambient air pressure while the intake side 544 preferably comprises one or more ports 552 such that the intake side 544 is in fluid communication with an air intake system of the associated engine.

With a spark-ignited gasoline engine, for example, the air intake manifold pressure is at high vacuum at idle and low power conditions. Under these conditions, the diaphragm member 540 exerts a strong pull force on the stem 524 to reduce the biasing force from the spring 534 and thereby the pump output pressure drops, which reduces the clamping force. Thus, the clamping force is reduced at idle because of the increased bypass flow. In other words, in the illustrated configuration, as the pressure in the intake system decreases, the stem 524 is pulled upward toward the intake side 544 of the chamber 542. Moving the stem 524 in this direction moves the valve member 520 further away from the valve seat 514, which increases the bypass flow, which in turn reduces the output pressure experienced in the passage 536 from the output of the first pump 524. Stated another way, operation of the valve member 520 can be influenced by changes in the intake manifold pressure and operation of the valve member 520 influences the output pressure experienced in the passage 536. Conversely, at high engine torques, the vacuum diminishes, which reduces the pull force and increases the pump output pressure. Hence, clamping force is increased. The change in relief pressure preferably does not significantly change the volume of the bypass flow. Other configurations also are possible.

Thus, because the clamping force on the belt or chain preferably is modulated in accordance with the torque load applied to the belt or chain, the relief valve can incorporate the diaphragm actuated override device that is connected to the engine intake manifold pressure to modulate the preset relief bypass pressure of the relief valve. The diaphragm is connected to an extension of the valve stem that, when influenced by changes in the engine intake manifold pressure, changes the effective force on the relief valve seat and therefore the output pressure of the pump. Thus, such a technique is completely mechanical and automatic. There is no required sensor input or electronics. Rather, a direction connection is required from the diaphragm chamber of the relief valve to the intake manifold in the spark ignited engine.

The configuration described above is a relatively simple and practical solution to controlling clamping pressures when compared to the complexities of a typical computer controlled system. Computer controlled systems generally gather information from engine and driveline sensors, including the position of the driver actuated throttle control. This information is used to control the ratio changing and the chain clamping forces by selective manipulation of the hydraulic system pressures. The illustrated configuration is completely mechanical and automatic. The illustrated configuration requires no sensor inputs or electronics. Rather, the illustrated configuration simply uses a direct fluid connection from the chamber 542 to the intake manifold of the spark-ignited engine.

In addition to supplying clamping pressure, and in addition to lubricating the flexible member 414 through the bypass flow, the first pump 424 also can supply lubrication to pulley bearings. In some configurations, the bearings can be lubricated by providing controlled leakage that escapes at each end of shaft labyrinth seals or the like external to the tubes that supply the pulley cylinders 440, 442. Such a flow of fluid can be about 50 cc/minute maximum for each of the four bearings at the highest required clamping force and oil temperature.

Figure 17:
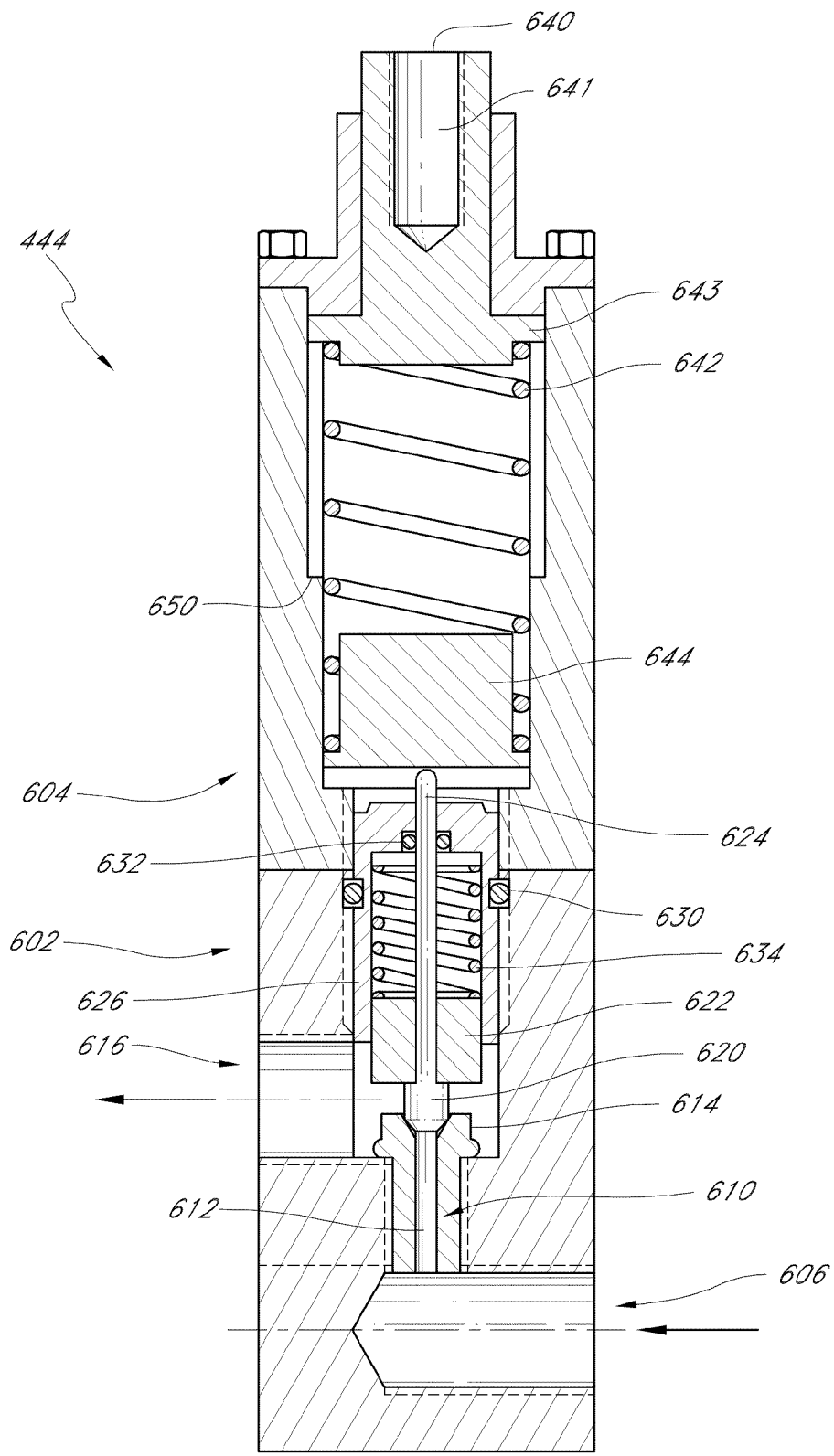
FIG. 17 is a sectioned view of another relief valve that mechanically adjusts a bypass flow to adjust clamping forces in a CVT module.

With reference now to FIG. 17, another embodiment of the relief valve 444 is illustrated therein. The illustrated relief valve 444 of FIG. 17 can be used with various types of engines. In some configurations, the relief valve 444 of FIG. 17 is used with a diesel engine. In particular, diesel powered vehicles use the relief valve 444 shown in FIG. 17 because the intake manifold pressure characteristics used with the relief valve 444 shown in FIG. 16 generally are not compatible with a diesel engine.

The relief valve 444 illustrated in FIG. 17 comprises a valve portion 602 and an adjustment portion 604. The adjustment portion 604 advantageously is connected (e.g., mechanically connected) to the valve portion 602 such that the adjustment portion 604 can adjust the valve portion 602 in manners that will be described.

The valve portion 602 comprises an inlet port 606. A valve body 610 is fluidly connected to the inlet port 606. The valve body 610 can be a threaded insert that can be positioned in a passage that is fluidly connected to the inlet port 606. Other configurations are possible.

The valve body 610 preferably comprises a through passage 612. An upper portion of the illustrated valve body 610 can comprise a valve seat 614. The valve seat 614 can comprise or be a tapered surface or the like. An outlet port 616 fluidly connects to the through passage 612. In some constructions, the outlet port 616 connects to the lubrication passage 446, which provides a bypass outlet.

A lower and/or outer surface of a valve member 620 can rest against the valve seat 614. In some configurations, the valve member 620 comprises an outer surface that is tapered and that can interface with the valve seat 614. In some configurations, the tapering of the outer surface of the valve member 620 is different from the tapering of the corresponding surface of the valve seat 614. The valve member 620 and the valve seat 614 can alter flow through the pressure relief valve 644.

A bushing 622 abuts an upper end of the valve member 620 and preferably is mounted on a stem 624 of the illustrated valve member 620. The bushing 622 can provide an enlarged surface that can slide along an inner surface of a sleeve 626. The sleeve 626 can thread into a bore formed in the valve portion, for example.

In some configurations, an interface between the sleeve 626 and the surrounding body can be sealed, such as with an o-ring 630 or the like. Similarly, an interface between the sleeve 626 and the stem 624 can be sealed, such as with an o-ring 632 or the like.

A spring 634 or other suitable biasing member can be positioned between the bushing 622 and a portion of the sleeve 626, for example, such that the valve member 620 is biased toward the valve seat 614. The biasing force of the spring 634 establishes a base pressure between the valve seat 614 and the valve member 620.

The stem 624 is connected to the adjustment portion 604. In particular, the stem 624 preferably is connected to an input member 640. The input member 640 can comprise a push rod in some embodiments. The illustrated input member 640 comprises a threaded hole 641 and a flange 643. The flange 643 can comprise a stepped lower surface in some embodiments.

The input member 640 preferably is connected to the throttle linkage or the foot pedal, for example. More preferably, the input member 640 is operatively associated with the throttle linkage, the foot pedal, both the throttle linkage and the foot pedal or some component that operates under the influence of the foot pedal or the throttle linkage. In some configurations, a remotely operated component can be used while other configurations use a direct coupling. The threaded hole 641 in the illustrated construction provides a connection to the foot pedal.

In any event, the input member 640 preferably is positioned at least partially within the adjustment portion 604. The stepped flange 643 of the illustrated input member 640 bears against a spring 642 or other biasing member. The stepped portion of the flange 643 can help keep the spring 642 properly positioned. The spring 642 also bears against an insert 644 such that the spring 642 pushes the input member 640 and the insert 644 away from each other but allows the movement (e.g., downward movement) of the input member 640 to cause movement (e.g., downward movement) of the insert 644. The insert 644 bears against the stem 624 in the illustrated configuration.

Thus, movement of the input member 640 in a downward direction causes compression of the spring 642, which causes the insert 644 to move downward against the stem 624. The movement of the insert 644 in turn causes movement of the stem 624, which increases the force applied to the valve member 620 in a closing direction. In other words, in some configurations, operation of the foot throttle starts the compression of the spring 642, which in turn applies more force through the stem 624, hence increasing the output bypass pressure of the pump, which thereby raises the clamping force on the CVT sheaves. The motions described above progressively increase the force up to the full throttle position. At the full throttle position, which results in the maximum chain clamping force, the input member 640 reaches a stop 650 to reduce the likelihood of the clamping force exceeding a predetermined limit.

While the configuration shown in FIG. 17 has been described in the context of a diesel engine, the configuration also can be used with a gasoline spark-ignition engine, electric motor or other suitable motive force components. In both cases, the torque and throttle position are directly related. In any event, the volume of bypass flow through the relief valve does not significantly change.

Figure 18:
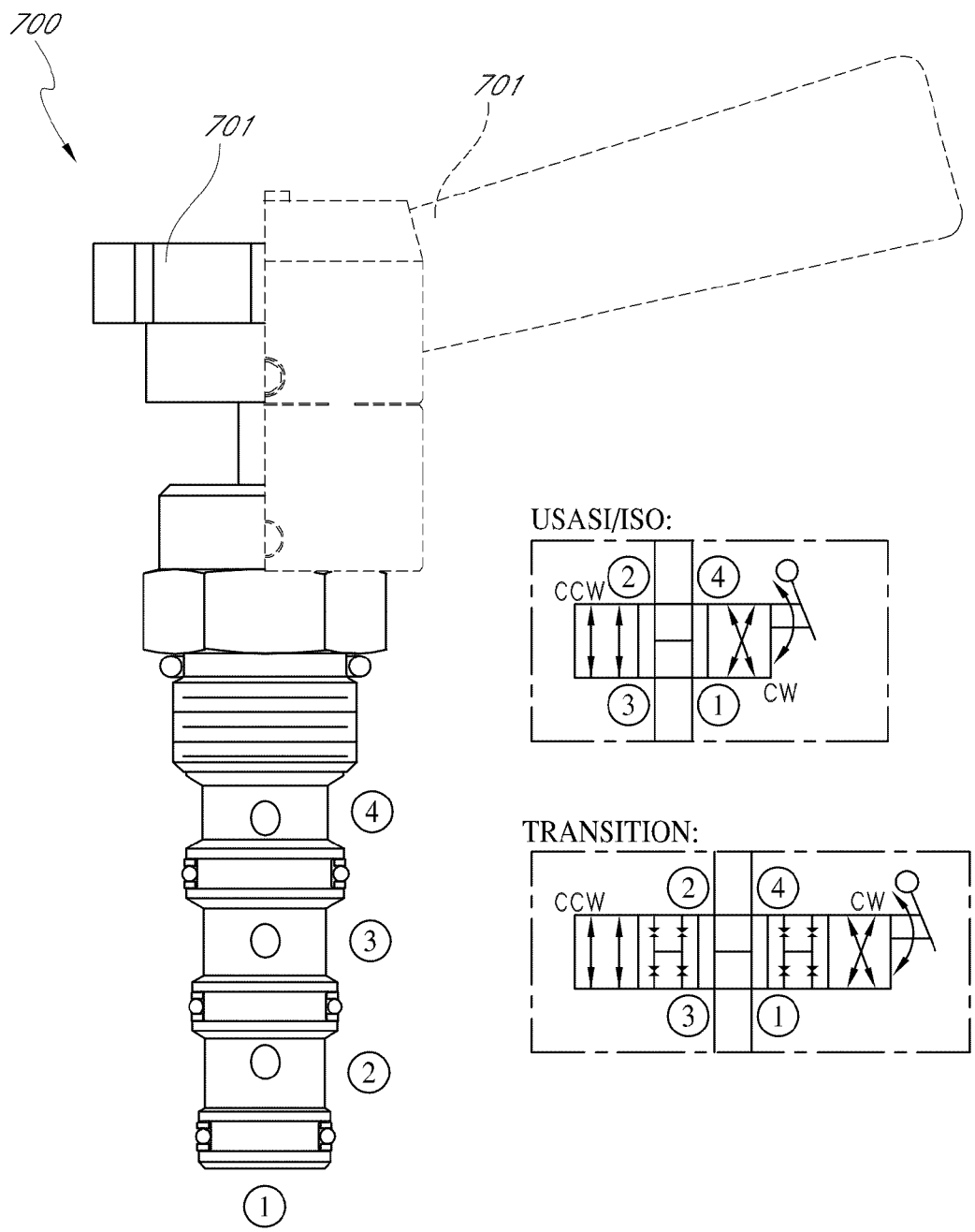
FIG. 18 is an illustration of a four-way valve used to control ratio change operations in a CVT module.

With reference again to FIG. 15, the second pump 426 is used to control ratio changes in the illustrated CVT 404. As shown, output from the pump 426 is supplied to a valve 700 through a supply line 702. The valve 700 can be a four-way valve in some configurations. In some configurations, the valve 700 can be a four-way open center valve (see FIG. 18). The valve 700 can be a four way spool valve that is actuated by a lever and that is spring loaded to the center with a dead band in the center. Other configurations are possible.

The valve 700 connects to the passage 436, which preferably is a high-pressure line, that connects the cylinders 440, 442. Preferably, the second pump 426 operates constantly with the input from the electric motor 422. Flow through the valve 700 can be bi-directional by manipulation of the valve 700 with high clamping pressure at an inlet port and an outlet port of the first pump 426. Preferably, pump internal leakage is routed through a planetary hydraulic supply line 704 from a case drain port to the planetary unit 420 for gear lubrication and to supply clutching forces that are used to control clutch functions of the planetary unit 420.

Since the pressure used to actuate the planetary functions is lower (e.g., about 200 psi) than the pressure used for CVT clamping forces (e.g., up to about 600 psi), a pressure reduction valve 706 can be inserted in the planetary hydraulic supply line 704 to reduce the likelihood of overpressurization. In some configurations, a hydraulic accumulator 708 is positioned between the pressure reduction valve 706 and the planetary unit 420 to accommodate an increased demand in hydraulic flow such as might be encountered in a shift sequence. Such configurations reduce the likelihood of momentary drops in CVT line pressure. In some configurations, the fluid from the hydraulic accumulator 708 passes to a shift selection valve 709. In some configurations, it may be desirable to provide a flow restrictor (not shown) between the accumulator and the planetary unit to reduce the likelihood of excessive speeds during the shift process.

When used with a CVT that does not incorporate centrifugal pressure compensation, the pressures in the cylinders 440, 442 are only naturally balanced when the sheaves 410, 412 are operating at near the same speed, or at a one to one ratio. The greatest imbalance is at the ratio extremes. For example, in the highest ratio (low gear), the primary cylinder 440 generates an increased internal pressure because of its higher speed than the secondary cylinder 442 because of the centrifugal force and visa-versa at the lowest ratio. This imbalance during an initial acceleration increases with sheave speed and can initiate a premature ratio change. To adjust to such a ratio change, the driver can move the lever 701 to the high ratio position (i.e., low gear) to create a higher observed pressure to the secondary cylinder 442. Once the engine speed reaches a desired level, the driver can allow a ratio change to start by reducing the bias through the lever 701 until a rate change is observed. By manipulation of the lever 701, the driver can control the rate change until overdrive is reached with the lever 701 in the low ratio position (i.e., high gear) or anywhere in between as desired. Such manipulation is similar to the use of a stick shift.

With the lever 701 in a maximum stroke in either direction (i.e., low gear position or high gear position), the cylinders 440, 442 will reach full stroke. With the cylinders 440, 442 at full stroke, cylinder to cylinder flow will substantially cease, which causes a hydraulic lock and can stall the pump 426 and the motor 422. Accordingly, a bypass relief valve 710 can be inserted to recirculate flow back to the pump 426 when a preset differential high pressure is reached. In some configurations, the bypass relief valve 710 is a 100 psi relief valve. The preset differential high pressure preferably is enough to hold the CVT 404 in the overdrive range while the vehicle operates in a cruise mode.

In some configurations, a manually operated control knob 712 can be provided to the bypass relief valve 710. The control knob (or handle) 712 can be used to adjust the bypass pressure differential such that shifting of the CVT 404 can be more finely adjusted, such as through a vernier (i.e., a more precise manner of adjusting the ratio than simply using the four way valve lever only).

Under normal acceleration of the associated vehicle, the four way valve handle 701 initially can be set in the low range position. As the speed increases, the driver can incrementally rotate the handle 701 to cause the ratio to change and eventually reach the high range or overdrive position. At this point, cylinder to cylinder flow will cease and the bypass relief valve 710 will recirculate the pump flow back to the pump 426. The pressure setting of the bypass relief valve 710 preferably is enough to hold the CVT ratio in a high range during normal cruise mode.

When passing or hill climbing, as well as other situations that the ratio is changed into a lower range by a small amount and with more precise control than can be achieved by the handle 701 of the four way valve 700, the four way valve handle 701 is left in the high range position but the differential pressure between the cylinders can be reduced with the control knob 712 of the bypass relief valve 710. The setting of the bypass relief valve 710 can be used to initiate a change and then can set the pressure to hold the desired ratio. The knob 712 of the bypass relief valve 710 can be returned to its highest pressure setting upon resumption of cruise mode.

In some applications, an instrument control panel (not shown) can show a road speed, an engine speed, CVT cylinder pressures and a sensed CVT ratio, for example. Such data can be used to help a driver efficiently control the CVT 404. Other configurations are possible. In some applications, the CVT ratio can be sensed with the use of potentiometers and volt meters, or the like.

In addition to the simplified control systems described above, some aspects of the present invention result in a modular construction that simplifies manufacturing and maintenance in the field. Moreover, by virtually removing all electronics from the device, no sophisticated diagnostic equipment is needed for trouble shooting. As noted above, in some configurations, a single 12 volt direct current motor drives a pump at each end. In some embodiments, the high pressure line from the pump is connected to the primary sheave leg of the cylinder pressurizing line to assure substantially full clamping pressure at the primary sheave at all times. Further, separate cooling and lube pumps are not needed while positive, separate lubrication can be provided to the CVT flexible member, the bearings and the planetary gear set.

While the arrangement described above is manually operated and generally does not require sensors and supporting electronics, it is possible that the basic system, as described above, need not be only manually operated. The manually operated handle 701 of the four way valve 700, for example, can be replaced by an actuator, such as a stepper motor, for example but without limitation. The stepper motor can automate the shift function for the CVT 404. In other words, the actuator can automatically manipulate the four way valve 700.

In some configurations, signal inputs can be obtained that represent an engine output speed (i.e., the speed of the transmission input shaft), a speed of the transmission output shaft 416, a CVT ratio position and a throttle position, for example but without limitation. These signals can be obtained from any suitable sensors. The signals can be provided to an electronic motion controller that integrates and processes the signals in accordance with suitable programming. The output of the motion controller then is connected to an electronic step motor drive that controls the positioning of the step motor and the hydraulic four way valve. In some configurations: the step motor is part number HT17-075, available from Applied Motion Products; the step motor drive is part number 1240i, also available from Applied Motion Products; the motion controller is part number P192, available from Trio Motion Technology; the input shaft speed sensor and the output shaft speed sensor are part number MP37TA, available from Red Lion; the ratio indicator is part number Linear Potentiometer 520173, available from ELAP; and the throttle position sensor is part number 657-0-0-502, available from Vishay Potentiometer.

In some configurations, the shaft speed sensors are magnetic pulse generators that can be located at shaft ends of the CVT. Such generators produce electric pulses 16 times per revolution. The linear transducer preferably follows the position of the moving primary sheave half and changes resistance as the drive ratio changes. Finally, the throttle position sensor can be directly connected to the throttle and can change resistance as the pedal moves. Other configurations also are possible.

Figure 20:
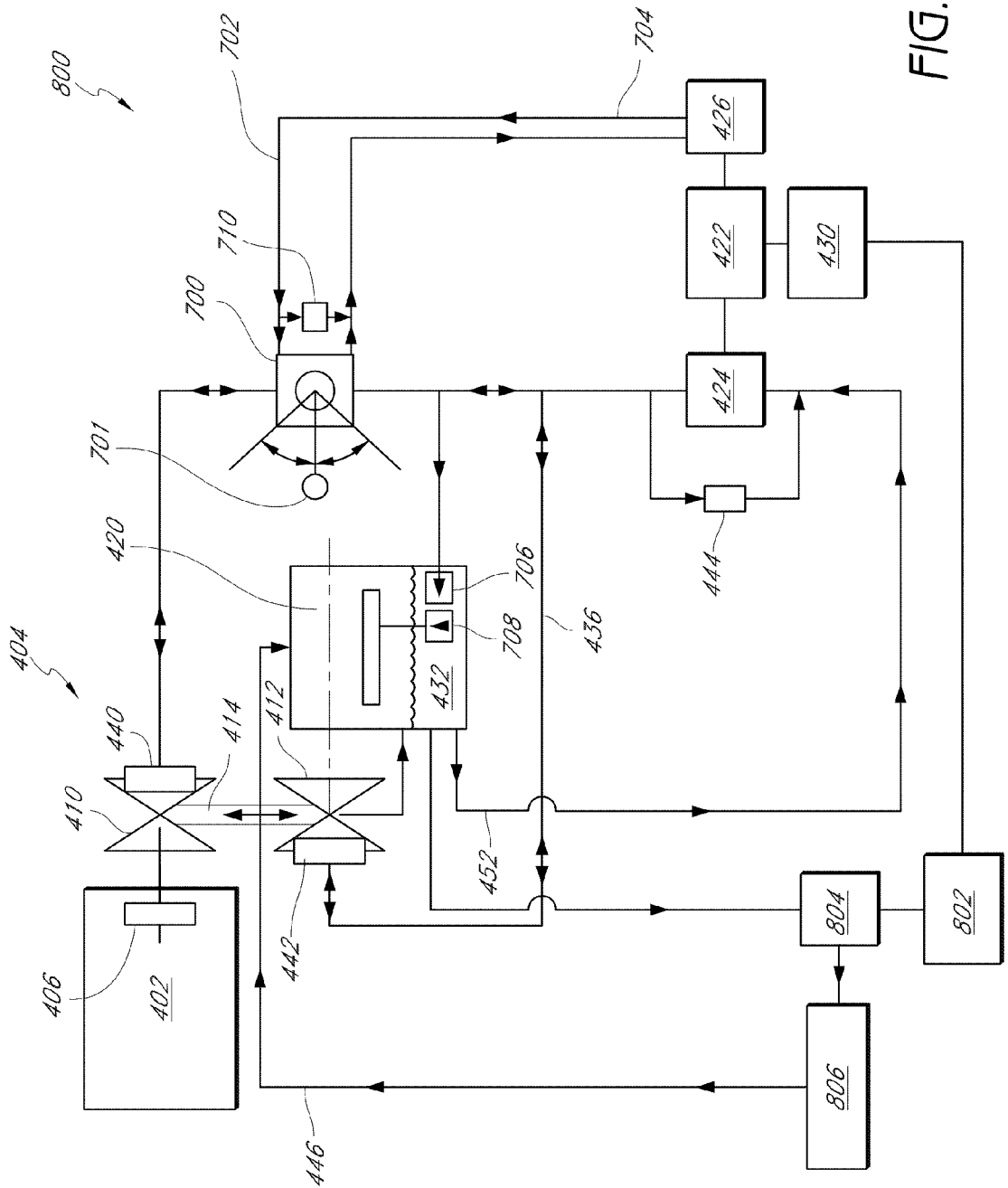

FIG. 20 illustrates another CVT system control 800 that is arranged and configured in accordance with certain features, aspects and advantages of the present invention. As with the CVT system control 400 described above and shown in FIG. 15, the CVT system control 800 provides a simplified and preferably substantially electronic free method of pressurizing and providing variable pressure control of a hydraulic system in a belt or chain drive continuously variable transmission. In the illustrated system control 800, two separate functions are controlled: chain clamping and cylinder pressure manipulation. The cylinder pressure manipulation changes CVT engine/drive line ratios when fluid passes from in either direction between cylinders. Rather than fully describe the components that remain generally the same between the CVT system control 400 of FIG. 15 and the CVT system control 800 of FIG. 20, the main differences will be described.

As illustrated in FIG. 20, the CVT system control 800 preferably has a separate module that supplies lubricant to the flexible transmitter 414 and the planetary transmission 420. The illustrated module comprises a motor 802. The motor 802 receives power from the power source 430, which was described above. Other configurations are possible.

The motor 802 drives a pump 804. The pump 804 can be any suitable pump, including those described above with respect to the pumps 424, 426. The pump 804 draws fluid from the reservoir 432. From the reservoir 432, the pump 804 feeds the fluid through a heat exchanger 806. From the heat exchanger 806, the fluid is used to lubricate the flexible transmitter 414 and is supplied to the planetary transmission 420 to lubricate the moving components of the planetary transmission 420. Thus, the cooling circuit can be split between the CVT chain and the planetary mechanism. This system preferably only operates at about 10 psi.

Thus, the construction of FIG. 20 differs from the construction of FIG. 15 primarily in the provision of a separate lubricant pump and motor (see FIG. 20) rather than using bypass flow and case drain flow to provide the desired lubrication (see FIG. 15). Given this primary difference, two other changes also can be found between FIG. 20 and FIG. 15. Namely, the pressure modulating relief valve 444 recirculates back to the first pump 424 without by a flow for lubrication purposes and the second pump 426 does not use the case drain to lubricate the gears of the planetary transmission. Otherwise, the construction of FIG. 20 is largely the same as the construction illustrated in FIG. 15.

Figure 21:
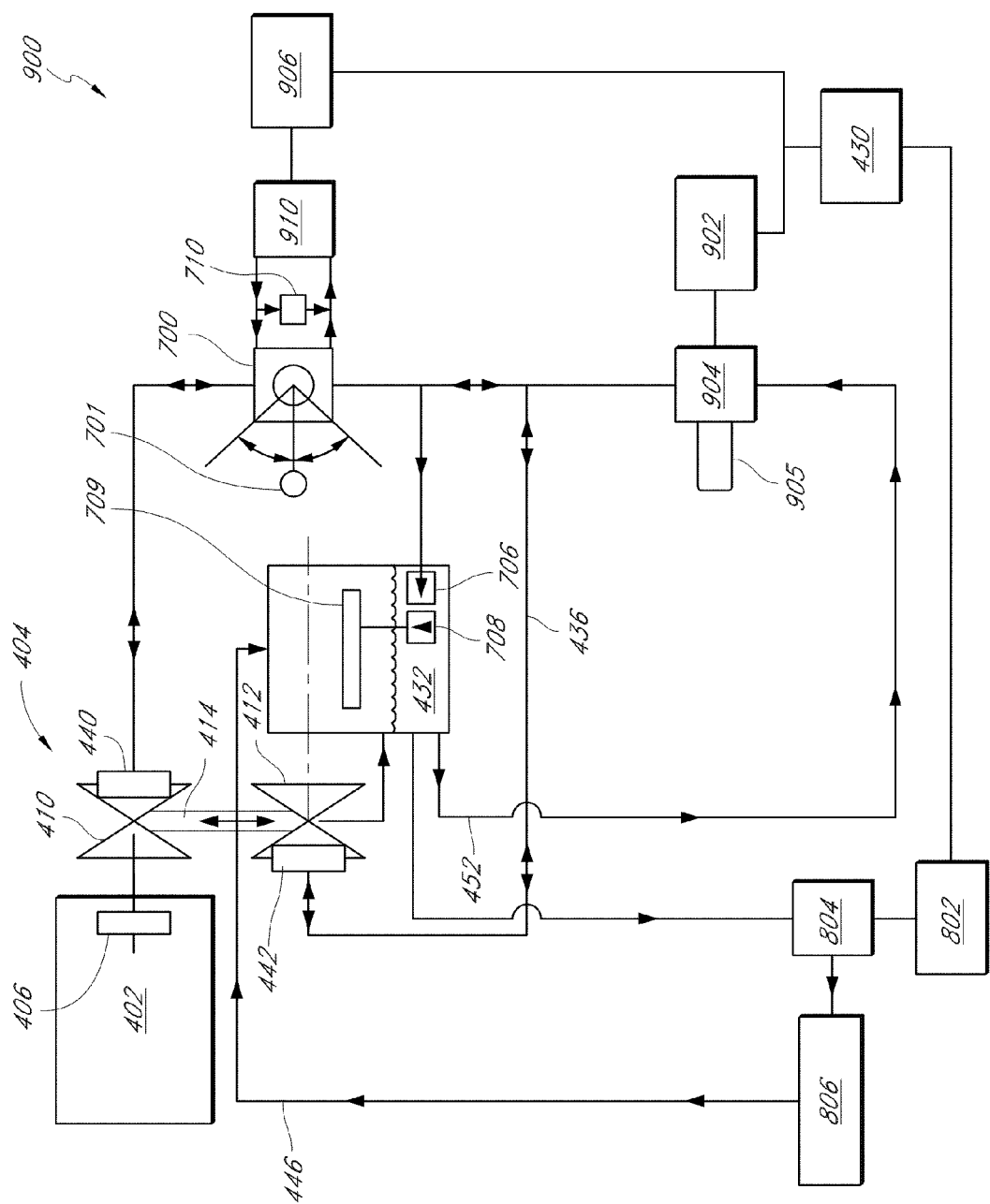
Figure 22:
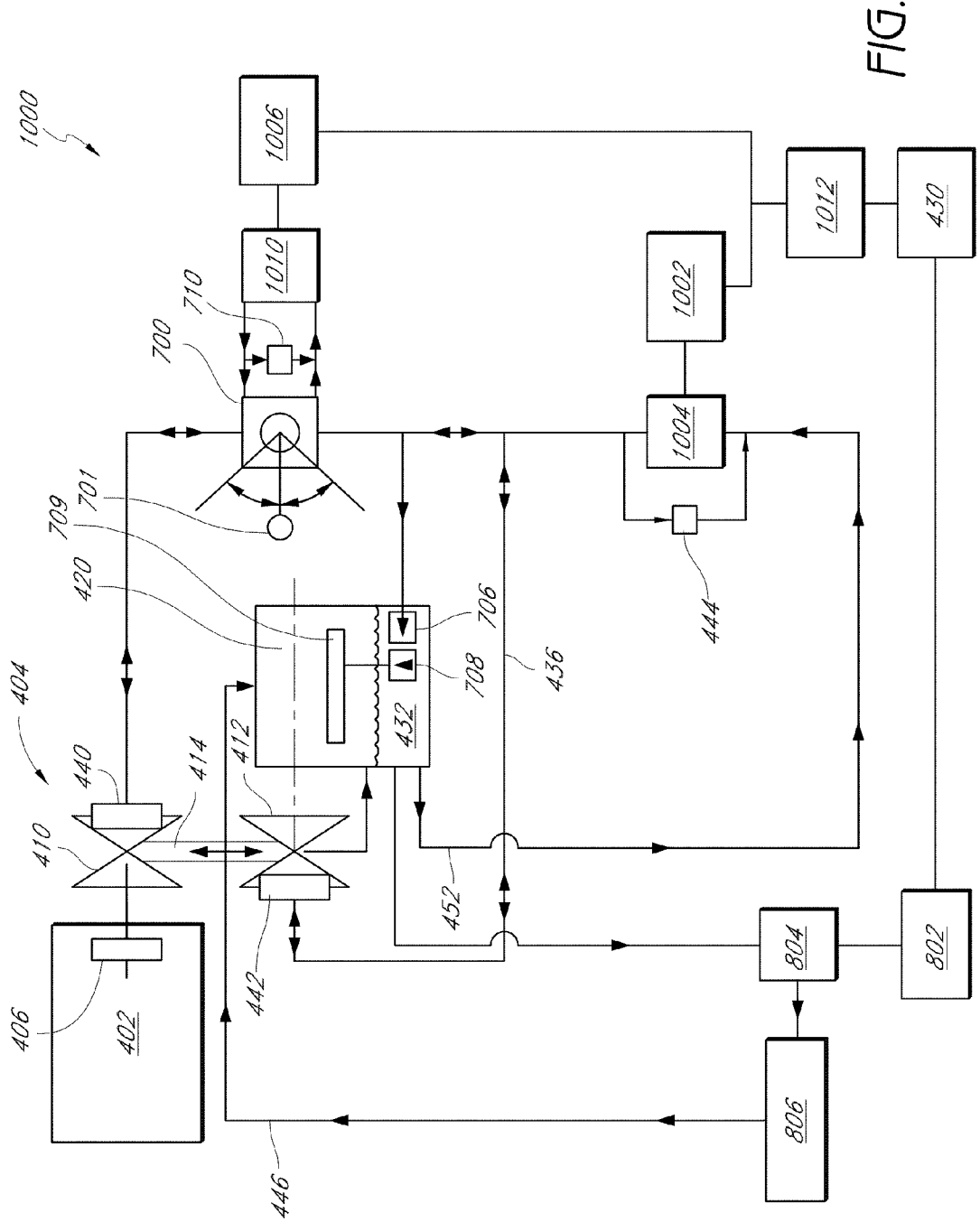

FIG. 21 illustrates another CVT system control 900 that is arranged and configured in accordance with certain features, aspects and advantages of the present invention and FIG. 22 illustrates a further CVT system control 1000 that is arranged and configured in accordance with certain features, aspects and advantages of the present invention. As with the CVT system control 800 described above and shown in FIG. 20, the CVT system controls 900 and 1000 provide simplified and preferably substantially electronic free methods of pressurizing and providing variable pressure control of a hydraulic system in a belt or chain drive continuously variable transmission. In the illustrated system controls 900, 1000, two separate functions are controlled: chain clamping and cylinder pressure manipulation. The cylinder pressure manipulation changes CVT engine/drive line ratios when fluid passes from in either direction between cylinders. Rather than fully describe the components that remain generally the same between the CVT system control 800 of FIG. 20 and respectively the CVT system control 900 of FIG. 21 and the CVT system control 1000 of FIG. 22, the main differences will be described.

The CVT system control 900 of FIG. 21 differs from the CVT system control 800 of FIG. 20 primarily in two regards. First, rather than driving the first and second pumps 424, 426 from a single motor 422 (shown in FIG. 20), the CVT system control 900 of FIG. 21 uses a first motor 902 to drive a first pump 904 and a second motor 906 to drive a second pump 910. Both motors 902, 906 can be powered by the same power source 430.

The first pump 904 can be a variable displacement/variable pressure hydraulic pump of vane or other type, which draws oil from the reservoir 432. The oil is directed under pressure to the passage 436 that connects together the primary and secondary cylinders 440, 442 of the CVT 404, similar to that described above, to establish the clamping force for both sheaves 410, 412 and for other functions. The first pump 904 preferably can vary the output flow and pressure through a pressure modulating actuator 905. In some embodiments, a spring loaded pressure setting can be changed according to the clamping force desired. The bypass relief valve shown in FIG. 15 and FIG. 20 is eliminated in the system 900 of FIG. 21 and is no longer a source of energy loss and heat generation.

The CVT system control 1000 of FIG. 22 differs from the CVT system control 800 of FIG. 20 primarily in two regards. First, rather than driving the first and second pumps 424, 426 from a single motor 422 (shown in FIG. 20), the CVT system control 1000 of FIG. 22 uses a first motor 1002 to drive a first pump 1004 and a second motor 1006 to drive a second pump 1010. Both motors 1002, 1006 can be powered by the same power source 430 following a conversion to 115 volts AC by a converter 1012. Other configurations are possible.

Figure 23:
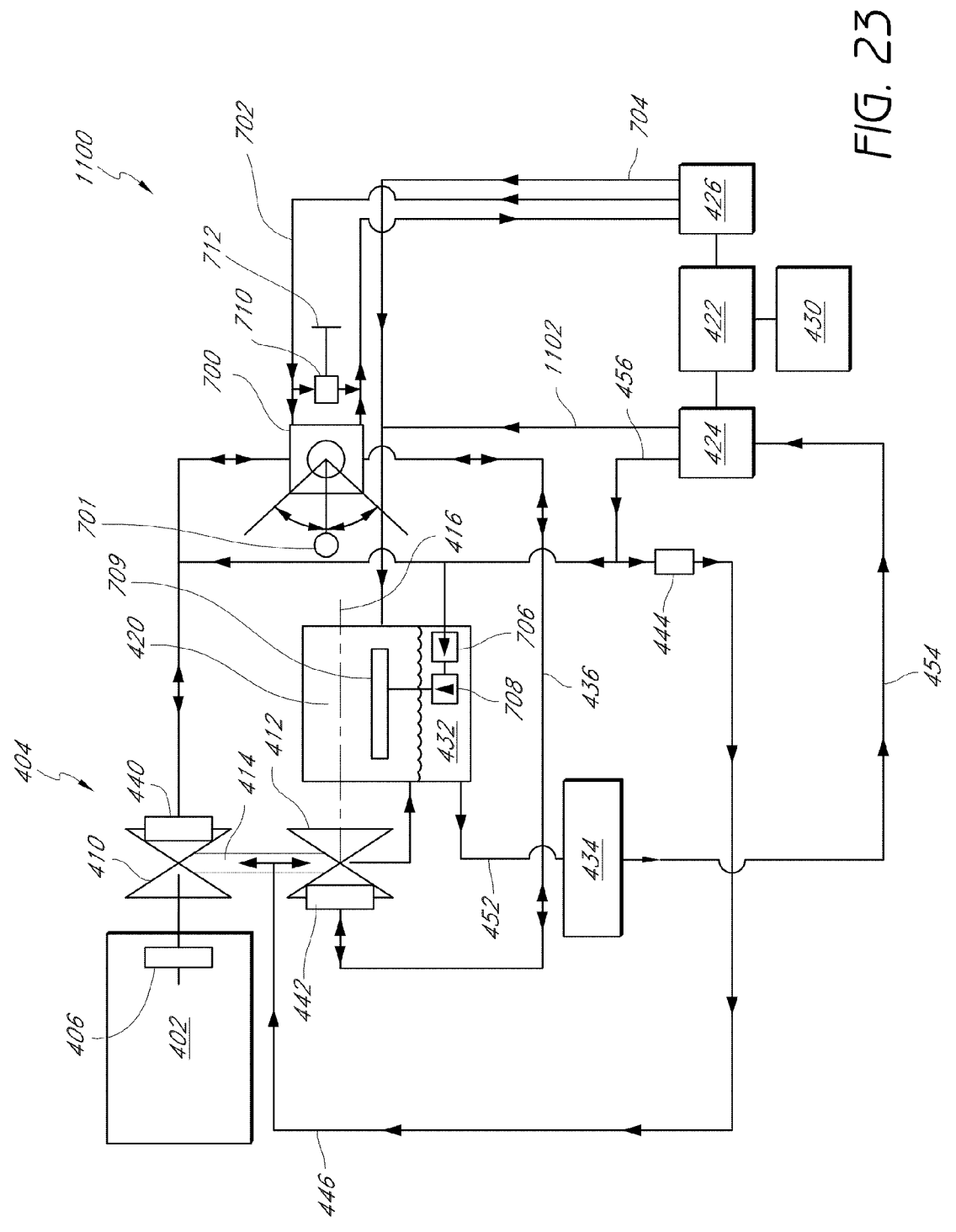

FIG. 23 illustrates a further CVT system control 1100. The CVT 1100 of FIG. 23 differs from the CVT system control 400 of FIG. 15 in that the internal leakage of the pump 424 is directed from the case drain to the planetary gear system of the planetary transmission 420 as planetary gear lubrication. In the configuration of FIG. 23, the internal leakage of the pump 424 is provided to the planetary transmission 420 as shown by line 1102 while, in the configuration of FIG. 15, that same flow was provided to the chain 414 through line 450. Thus, the internal leakage of the pump 424 is used for the planetary unit gear lube, for example, in the configuration shown in FIG. 23.

The transmissions described above have been designed particularly for use in motor vehicle applications, such as sport utility vehicles and medium size trucks, vans, buses, and the like. Such vehicles have ground clearances and/or frame designs that can accept an offset drive shaft. For instance, in one arrangement, the offset is on the order of about nine inches. The transmission can be adapted for other applications, if desired, and the offset can be vertical, horizontal or any angle in between. Moreover, the illustrated embodiment of the present invention disclosed herein is capable of transferring input torques in excess of 750 Newton meters (N.m) and can function with a ratio spread in excess of 5 to 1.

Notwithstanding the vehicles for which the transmission 120 was originally designed, the transmission 120 can be used in other applications. The CVT modules described above comprise a stepless ratio changing drive module that can be used in conjunction with any of a number of input and output devices to define a complete transmission that can be used in a variety of different applications. For instance, the CVT module can be coupled with a torque converter or the like. Alternatively, the CVT module can be directly coupled to an input shaft and an output shaft such that the CVT module defines the entire transmission.

One or more of the CVT modules and the associated methods can accomplish at least two separate functions. First, without the need for complicated electronics, one or more of the illustrated CVT modules provide a variable system pressure control for chain clamping and other use. Second, one or more of the illustrated CVT modules provide for differential cylinder pressure manipulation, which changes the CVT engine/drive line ratios when fluid passes in either direction from cylinder to cylinder.

Although the present invention has been disclosed in the context of certain preferred embodiments, examples and variations, it will be understood by those skilled in the art that the present invention extends beyond the specifically disclosed embodiments to other alternative embodiments and/or uses of the invention and obvious modifications and equivalents thereof. For example, in the event of serial production requirements all of the system components can be redesigned/combined etc. for cost effective results. In addition, while a number of variations of the invention have been shown and described in detail, other modifications, which are within the scope of this invention, will be readily apparent to those of skill in the art based upon this disclosure. It is specifically contemplated that various combinations or subcombinations of the specific features and aspects of the embodiments described herein may be made and still fall within the scope of the invention. It should be understood that various features and aspects of the disclosed embodiments can be combined with or substituted for one another in order to form varying modes of the disclosed invention. Moreover, some variations that have been described with respect to one embodiment and not another embodiment can be used with such other embodiments. Many other variations also have been described herein and cross-application is intended where physically possible. Thus, it is intended that the scope of the present invention herein disclosed should not be limited by the particular disclosed embodiments described above, but should be determined only by a fair reading of the claims that follow.

What is claimed is:

1. A modular transmission assembly comprising a continuously variable transmission module and a hydraulically-actuated planetary transmission module;

the continuously variable transmission module comprising a CVT input shaft, the CVT input shaft being coupled to a clutch assembly, the CVT input shaft being coupled to an input pulley assembly, the input pulley assembly being connected to an output pulley assembly by a flexible transmitter, the input pulley assembly and CVT output pulley assembly being substantially identical in construction, the CVT output pulley assembly being coupled to a CVT output shaft;

the CVT input shaft comprising a first end and a second end, the first end comprising a first bore that extends along a rotational axis of the CVT input shaft, the first bore comprising a splined inner surface, the second end of the CVT input shaft comprising a second bore and a journal portion, the second bore extending along the rotational axis of the CVT input shaft, the second bore also extending inward along the rotational axis to a location beyond the journal portion;

the second end of the CVT input shaft further comprising an externally threaded region that is generally adjacent to the journal portion, a lock nut threaded onto the externally threaded region, a bearing being positioned along the journal portion, the bearing comprising an inner race that is secured in position by the lock nut, the bearing comprising an outer race that is secured in position by a retaining ring;

the input pulley assembly comprising a bulkhead mounted to the CVT input shaft, the CVT input shaft comprising a locating step and the bulkhead generally abutting the locating step, the bulkhead and the CVT input shaft being joined for rotation;

the bulkhead comprising an outer skirt, the outer skirt comprising an outer skirt spline region and a bearing region, a small gap being provided between the outer skirt spline region and the bearing region, a ring groove being disposed within the small gap, the ring groove receiving a sealing component;

the first end of the input shaft comprising a disk portion and a journal portion, the journal portion overlapping at least a portion of the first bore, a movable disk having a portion positioned between the disk portion of the first end of the CVT input shaft and the bulkhead, the movable disk comprising an inner bore, the CVT input shaft extending through the inner bore of the movable disk, the movable disk also comprising a cylinder wall, the cylinder wall extending over an outer surface of the bulkhead, the sealing component of the bulkhead being positioned between an inner surface of the cylinder wall and the ring groove of the bulkhead, the inner surface of the cylinder wall comprising a cylinder wall spline region, the cylinder wall spline region engaging the outer skirt spline region, an input pulley cylinder chamber being defined by the cylinder wall, the bulkhead and the movable disk, a radial passage extending from the second bore of the CVT input shaft and opening into the input pulley cylinder chamber;

the continuously variable transmission module further comprising an outer housing, the outer housing completely enclosing substantially all moving components of the continuously variable transmission module, the outer housing comprising two separable substantially identical housing portions, the two separable substantially identical housing portions defining, when combined, a belt chamber that encloses the input pulley assembly, the output pulley assembly and the flexible transmitter, the separable substantially identical housing portions each comprising a flange along which the two separable substantially identical housing portions are joined, the two separable substantially identical housing portions supporting the input pulley assembly and the output pulley assembly, a lower portion of the housing defining a sump;

a tube extending into the second bore of the CVT input shaft from the second end of the CVT input shaft, a first end of the tube being secured against rotation such that rotation of the CVT input shaft does not result in substantial rotation of the tube, a second end of the tube carrying a plug, the plug generally closing the second end of the tube, the plug comprising a through bore;

the hydraulically-actuated planetary transmission module comprising a planetary input shaft, the planetary input shaft being coupled to the CVT output shaft, the planetary input shaft also being connected to a forward drive gear and a reverse drive gear, the forward drive gear and the reverse drive gear being connected to a planetary output shaft, the planetary transmission module further comprising a park position and a neutral position;

the hydraulically-actuated planetary transmission module comprising a planetary outer housing, the planetary outer housing enclosing substantially all of the moving components of the hydraulically-actuated planetary transmission, the planetary outer housing comprising a speedometer pickup mounting location and an odometer pickup mounting location, a fluid reservoir communicating with the hydraulically-actuated planetary transmission module;

a selector valve connected to a shift actuator, the selector valve being selectively fluidly connected to a high clutch pack, a reverse clutch pack and a low brake band, the selector valve also being fluidly connected to the fluid reservoir through a first hydraulic pump, a pressure regulator controlling a pressure of the connection between the selector valve and the first hydraulic pump;

the input pulley cylinder chamber also being fluidly connected to the fluid reservoir through the first hydraulic pump, the pressure regulator also controlling the pressure of the connection between the input pulley cylinder chamber and the first hydraulic pump; and an adapter plate coupling the continuously variable transmission module to the hydraulically-actuated planetary transmission module, the adapter plate formed to allow the continuously variable transmission module to be coupled at more than one orientation relative to the hydraulically-actuated planetary transmission module, the adapter plate comprising a first set of holes that align with mounting features on the continuously variable transmission module and a second set of holes that align with mounting features on the hydraulically-actuated planetary transmission module, the adapter plate not forming a portion of the outer housing of the continuously variable transmission module or an outer housing of the hydraulically-actuated planetary transmission module.

2. The assembly of claim 1, wherein a speedometer transmitter is mounted in the speedometer pickup mounting location, the speedometer transmitter being positioned adjacent to a parking gear.

3. The assembly of claim 1, wherein an odometer transmitter is mounted in the odometer pickup mounting location, the odometer transmitter being positioned adjacent to a parking gear.

4. The assembly of claim 1, wherein the fluid reservoir is secured to the planetary outer housing.

5. The assembly of claim 1, wherein the hydraulically-actuated planetary transmission module comprises a front plate, the adapter plate being secured to the front plate and a seal being positioned between the front plate and the adapter plate.

6. The assembly of claim 1, wherein a baffle is positioned within the outer housing between the flexible transmitter and the sump.

7. The assembly of claim 1, wherein the first end of the tube comprises a pair of holes, a pin extending through the pair of holes in the first end of the tube and into a fitting and the fitting being secured to the outer housing.

8. The assembly of claim 1, wherein the moveable disk and the cylinder wall are integrally formed.

9. The assembly of claim 1, wherein the cylinder wall spline region is axially shorter than the outer skirt spline region.

10. The assembly of claim 1, wherein a portion of the first end of the CVT input shaft defines a journal surface, the journal surface forming an inner race of a bearing, an outer race of the bearing being positioned within a recess formed in a portion of one of the two substantially identical housing portions.

11. The assembly of claim 1, wherein the disk portion of the first end of the CVT input shaft is integrally formed with the CVT input shaft.

12. The assembly of claim 1, wherein at least one pin secures the bulkhead to the locating step such that the bulkhead and the CVT input shaft are joined for rotation by the at least one pin.

13. The assembly of claim 1, wherein at least one of the flanges of the two separable substantially identical housing portions comprises a groove and a sealing structure is positioned at least partially in the groove.

14. The assembly of claim 1, wherein a first shaft opening is formed in a first one of the two separable substantially identical housing portions, a portion of the CVT input shaft extending through the first shaft opening, and a seal being disposed between an outer surface of the CVT input shaft and the first shaft opening.

15. The assembly of claim 1, wherein the two separable substantially identical housing portions comprise bosses that are used to secure together the two separable substantially identical housing portions.

16. The assembly of claim 15, wherein threaded fasteners are used to secure together the bosses.

17. The assembly of claim 1, wherein in the flexible transmitter comprises a chain.

18. The assembly of claim 1, wherein the continuously variable transmission module comprises a single belt continuously variable transmission module.

19. The assembly of claim 1, wherein the planetary transmission module comprises a two-speed planetary module.

* * * * *